US012600505B2

(12) United States Patent
Yang et al.

(10) Patent No.: US 12,600,505 B2
(45) Date of Patent: Apr. 14, 2026

(54) HANGAR FOR UNMANNED AERIAL VEHICLE, VEHICLE AND CONTROL METHOD

(71) Applicant: BYD COMPANY LIMITED,
Shenzhen (CN)

(72) Inventors: Dongsheng Yang, Shenzhen (CN);
Zhenglin Wei, Shenzhen (CN); Yi Li,
Shenzhen (CN); Jicheng Chen,
Shenzhen (CN); Dongping Li,
Shenzhen (CN); Hongkun Lai,
Shenzhen (CN)

(73) Assignee: BYD COMPANY LIMITED,
Shenzhen (CN)

( * ) Notice: Subject to any disclaimer, the term of this patent is extended or adjusted under 35 U.S.C. 154(b) by 0 days.

(21) Appl. No.: 19/024,237

(22) Filed: Jan. 16, 2025

(65) Prior Publication Data

US 2025/0162739 A1     May 22, 2025

Related U.S. Application Data

(63) Continuation of application No. PCT/CN2023/090586, filed on Apr. 25, 2023.

(30) Foreign Application Priority Data

Jul. 19, 2022    (CN) .......................... 202210855166.6

(51) Int. Cl.
    *B64U 10/14*         (2023.01)
    *B64U 80/10*         (2023.01)
    (Continued)

(52) U.S. Cl.
    CPC ............. *B64U 80/86* (2023.01); *B64U 80/10*
    (2023.01); *B64U 80/25* (2023.01); *B64U*
    *80/70* (2023.01); *B64U 10/14* (2023.01)

(58) Field of Classification Search
    CPC ........ B64U 10/14; B64U 50/39; B64U 80/10;
              B64U 80/20; B64U 80/25; B64U 80/70;
              B64U 80/86; B60L 53/80; B60S 5/06
              (Continued)

(56) References Cited

U.S. PATENT DOCUMENTS 10,414,517 B2 *   9/2019   Wang ..................... B64U 70/97
12,030,403 B2 *   7/2024   Henry ........................ B64F 1/20
(Continued)

FOREIGN PATENT DOCUMENTS

CN      107060447 A     8/2017
CN      208842641 U     5/2019
          (Continued)

OTHER PUBLICATIONS

The World Intellectual Property Organization (WIPO) International Search Report for PCT/CN2023/090586 Jul. 31, 2023 7 Pages (including translation).

*Primary Examiner* — Joshua E Rodden
(74) *Attorney, Agent, or Firm* — Wenye Tan

(57) ABSTRACT

A hangar is provided for an unmanned aerial vehicle, and is suitable for being arranged on a vehicle. The hangar includes a hangar body, the hangar body being configured to accommodate the unmanned aerial vehicle; a charging apparatus, the charging apparatus being arranged in the hangar body, and the charging apparatus being configured to charge an unmanned aerial vehicle battery, wherein the unmanned aerial vehicle battery includes a first battery mounted on the unmanned aerial vehicle and/or a second battery outside the unmanned aerial vehicle; and a battery pick-and-place apparatus, the battery pick-and-place apparatus being arranged in the hangar body, and the battery pick-and-place apparatus being configured to detach the first battery from the (Continued)

unmanned aerial vehicle and/or mount the second battery into the unmanned aerial vehicle.

17 Claims, 13 Drawing Sheets

(51) Int. Cl.
  *B64U 80/25* (2023.01)
  *B64U 80/70* (2023.01)
  *B64U 80/86* (2023.01)

(58) Field of Classification Search
  USPC ...................................................... 244/114 R
  See application file for complete search history.

(56) References Cited

U.S. PATENT DOCUMENTS

| | | | | |
|---|---|---|---|---|
| 12,286,252 B2 * | 4/2025 | Kim | ........................ | B64U 70/99 |
| 12,312,108 B2 * | 5/2025 | Krasnopolski | .......... | B60L 53/14 |

| | | | | |
|---|---|---|---|---|
| 2016/0039540 A1 * | 2/2016 | Wang | ........................ | B64F 1/20 |
| | | | | 244/114 R |
| 2016/0364989 A1 * | 12/2016 | Speasl | ........................ | G08G 5/57 |
| 2017/0120763 A1 * | 5/2017 | Henry | ..................... | G05D 1/654 |
| 2017/0129352 A1 * | 5/2017 | Lin | ............................ | B25J 9/00 |
| 2017/0129464 A1 * | 5/2017 | Wang | ..................... | H02J 7/0045 |
| 2018/0208070 A1 * | 7/2018 | Sanchez | ................ | B64U 10/13 |
| 2023/0257139 A1 * | 8/2023 | Straus | .................... | B64U 10/13 |
| | | | | 244/114 R |
| 2025/0128638 A1 * | 4/2025 | Scheler | ................... | B60L 53/30 |

FOREIGN PATENT DOCUMENTS

| | | | | | |
|---|---|---|---|---|---|
| CN | 110475689 | A | | 11/2019 | |
| CN | 112141354 | A | | 12/2020 | |
| CN | 112477737 | A | | 3/2021 | |
| CN | 113183860 | A | | 7/2021 | |
| CN | 113859046 | A * | 12/2021 | ............. | B64U 80/86 |
| CN | 113928585 | A | | 1/2022 | |
| CN | 116280340 | A * | 6/2023 | ............. | B64F 1/007 |
| KR | 20210104205 | A | | 8/2021 | |

* cited by examiner

220

221          4120          222

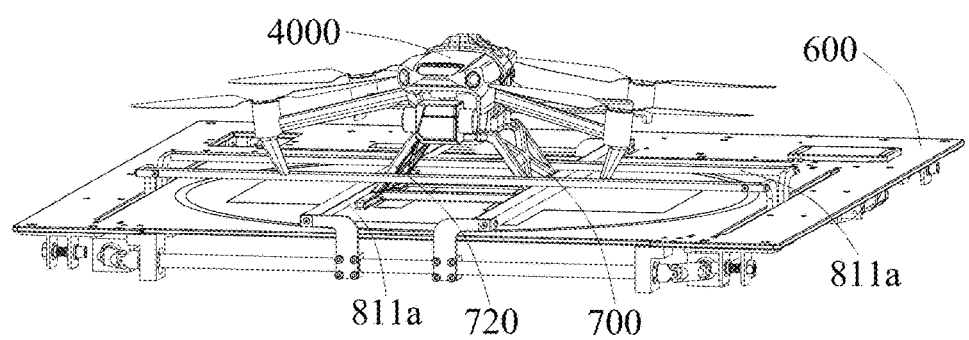

FIG. 18

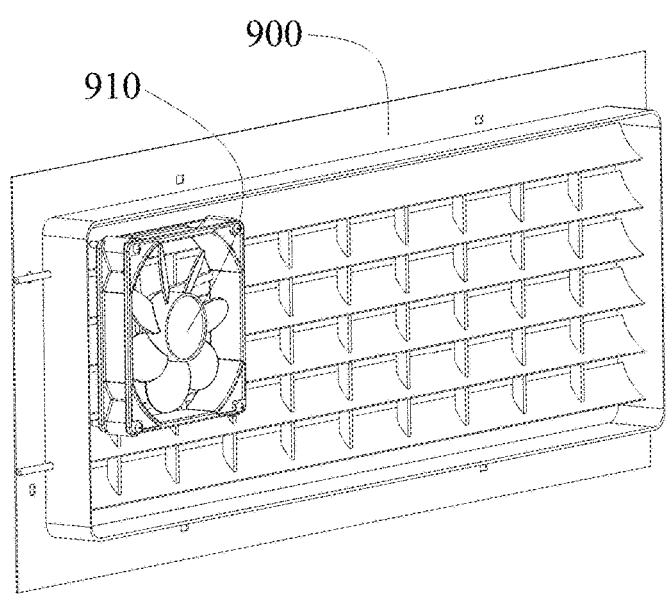

FIG. 19

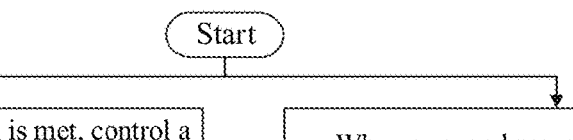

| When a first preset condition is met, control a battery pick-and-place apparatus to detach a first battery on an unmanned aerial vehicle from the unmanned aerial vehicle, and mount a second battery outside the unmanned aerial vehicle into the unmanned aerial vehicle | When a second preset condition is met, control a charging apparatus to be electrically connected to an unmanned aerial vehicle or a first battery on the unmanned aerial vehicle to charge the first battery |
| --- | --- |
| S101 | S102 |

FIG. 20

HANGAR FOR UNMANNED AERIAL VEHICLE, VEHICLE AND CONTROL METHOD

CROSS-REFERENCE TO RELATED APPLICATIONS

The present application is a continuation application of PCT application No. PCT/CN2023/090586, filed on Apr. 25, 2023, which is proposed based on and claims priority to Chinese Patent Application No. 202210855166.6, filed on Jul. 19, 2022, content of all of which is incorporated herein by reference in its entirety.

FIELD

The present disclosure belongs to the field of unmanned aerial vehicle devices, and in particular, to a hangar for an unmanned aerial vehicle, a vehicle, and a control method.

BACKGROUND

A hangar for an unmanned aerial vehicle in the related art can be transported to a designated location by a vehicle, and then releases the unmanned aerial vehicle to perform related work. When a battery life of the unmanned aerial vehicle is insufficient, the unmanned aerial vehicle is recovered and the battery life time is supplemented by manual battery replacement or charging.

However, for an unmanned aerial vehicle that needs to follow a vehicle while the vehicle is driving, the unmanned aerial vehicle cannot be charged manually without stopping the vehicle. In addition, because driving time of the vehicle may be long or short, it is difficult to ensure that the battery life time of the unmanned aerial vehicle can cover the driving time of the vehicle as much as possible.

SUMMARY

To resolve the foregoing technical problems, the present disclosure provides a hangar for an unmanned aerial vehicle.

A specific technical solution of the present disclosure is as follows.

A hangar for an unmanned aerial vehicle is suitable for being arranged on a vehicle. The hangar includes a hangar body, where the hangar body is configured to accommodate the unmanned aerial vehicle; a charging apparatus, where the charging apparatus is arranged in the hangar body, and the charging apparatus is configured to charge an unmanned aerial vehicle battery, where the unmanned aerial vehicle battery includes a first battery mounted on the unmanned aerial vehicle and/or a second battery outside the unmanned aerial vehicle; and a battery pick-and-place apparatus, where the battery pick-and-place apparatus is arranged in the hangar body, and the battery pick-and-place apparatus is configured to detach the first battery from the unmanned aerial vehicle and/or mount the second battery into the unmanned aerial vehicle.

The present disclosure further provides a vehicle, equipped with the hangar for an unmanned aerial vehicle provided in the present disclosure.

The present disclosure further provides a control method for a hangar for an unmanned aerial vehicle. The hangar is the hangar provided in embodiments of the present disclosure. The control method includes: When a first preset condition is met, a battery pick-and-place apparatus is controlled to detach a first battery on the unmanned aerial vehicle from the unmanned aerial vehicle, and a second battery is mounted outside the unmanned aerial vehicle into the unmanned aerial vehicle; and when a second preset condition is met, a charging apparatus is controlled to be electrically connected to the unmanned aerial vehicle or the first battery on the unmanned aerial vehicle to charge the first battery.

The present disclosure further provides a control device for a hangar for an unmanned aerial vehicle, including a processor and a memory. The processor and the memory are connected to each other. The memory is configured to store a computer program, the computer program includes program instructions, and the processor is configured to invoke the program instructions, to perform the control method provided in the present disclosure.

The present disclosure further provides a computer-readable storage medium. The computer-readable storage medium stores a computer program. When the computer program is executed by a processor, the control method provided in the present disclosure is implemented.

The additional aspects and advantages of the present disclosure will be provided in the following description, some of which will become apparent from the following description or may be learned from practices of the present disclosure.

3

Figure 14:
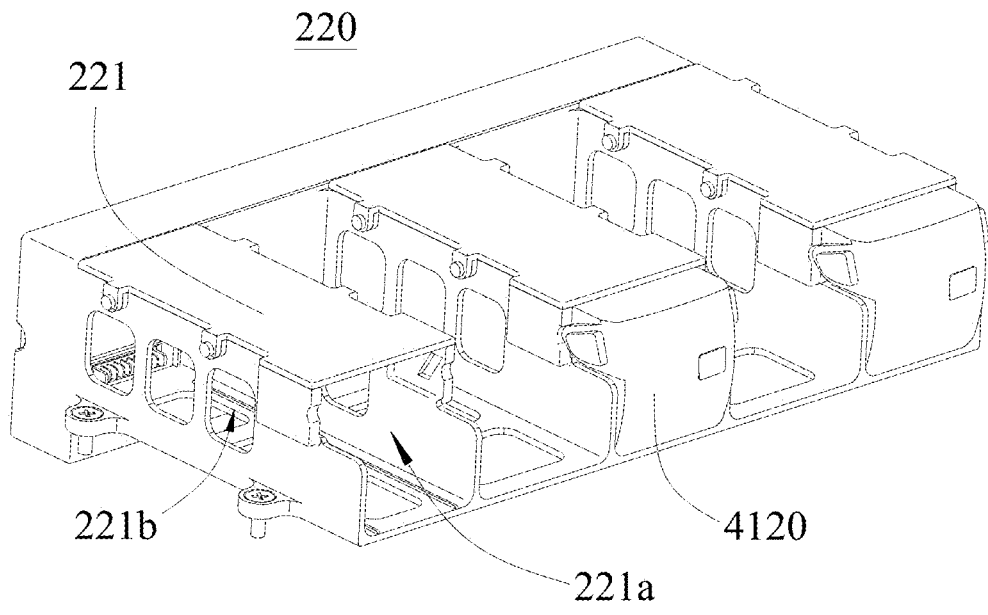
Figure 15:
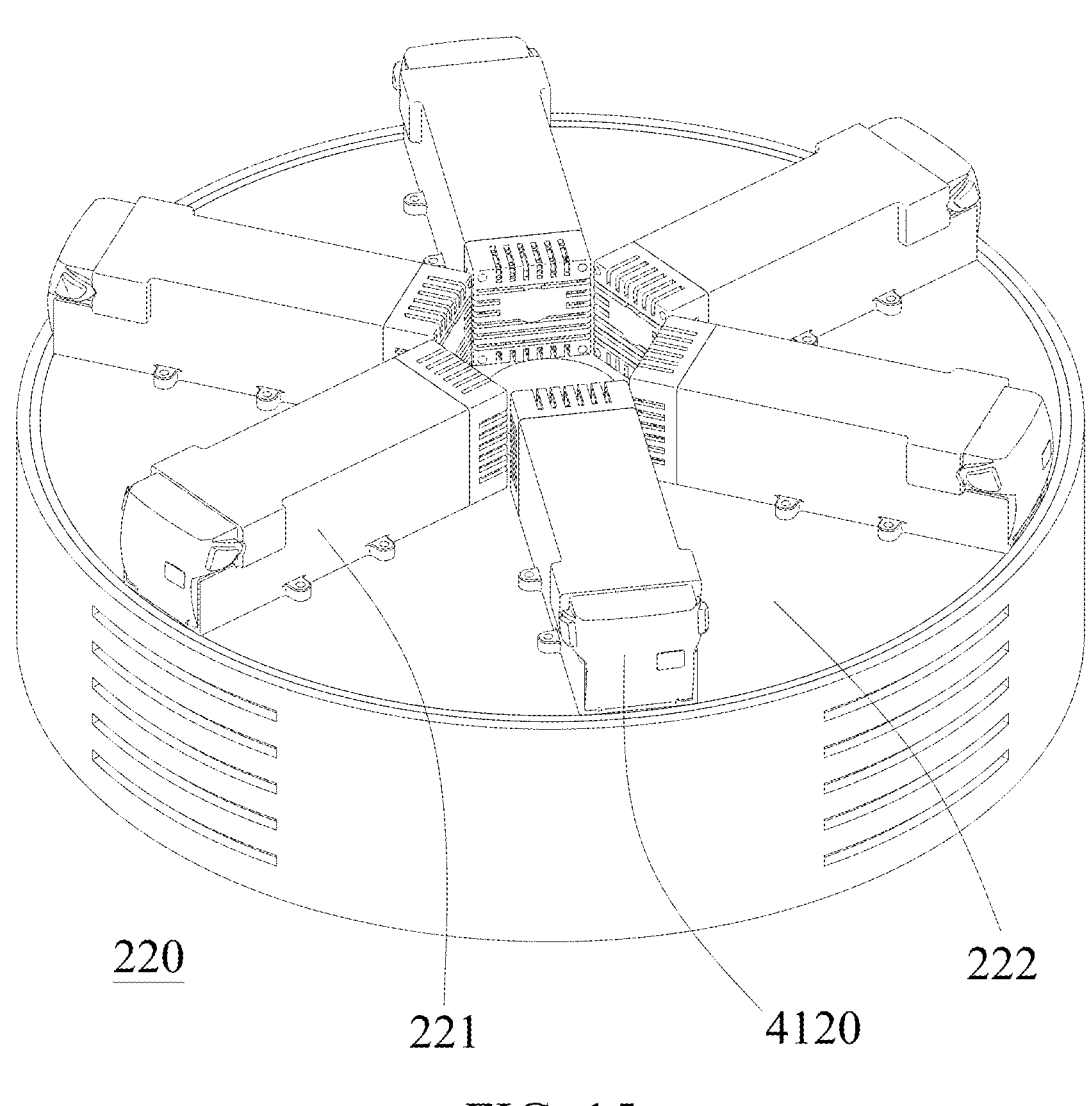
Figure 16:
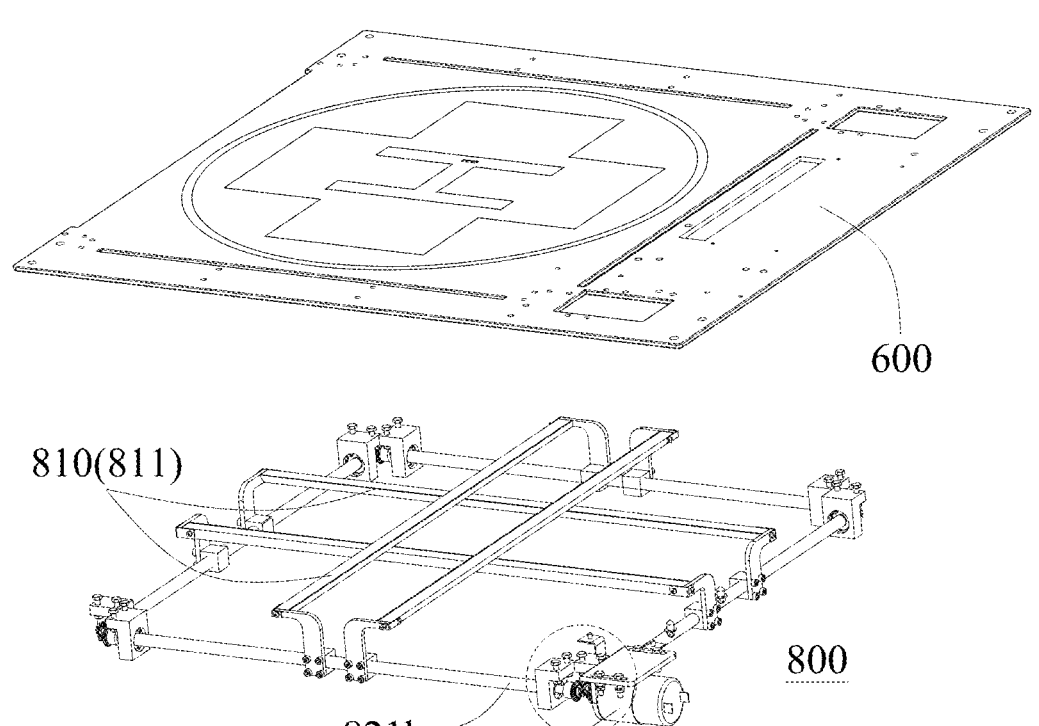
Figure 17:
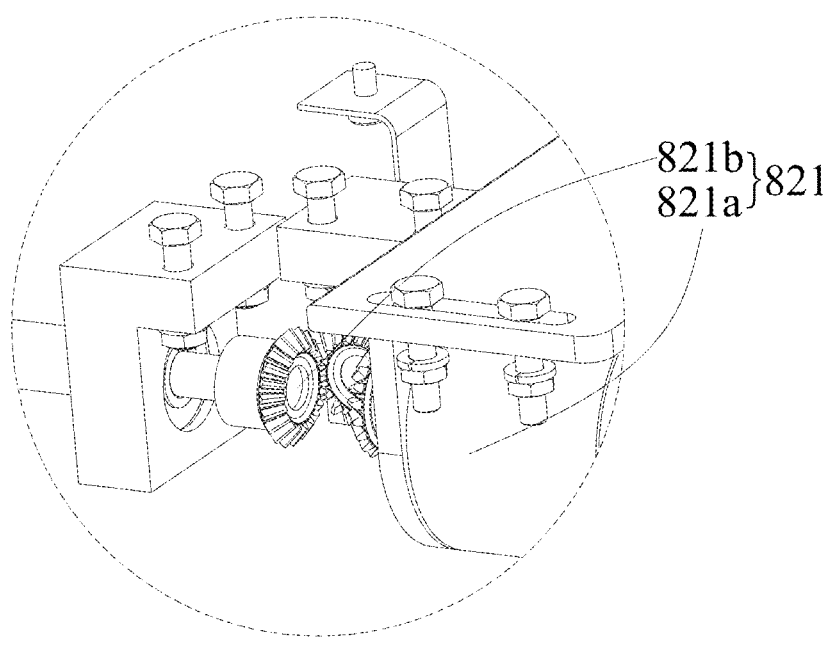
Figure 21:
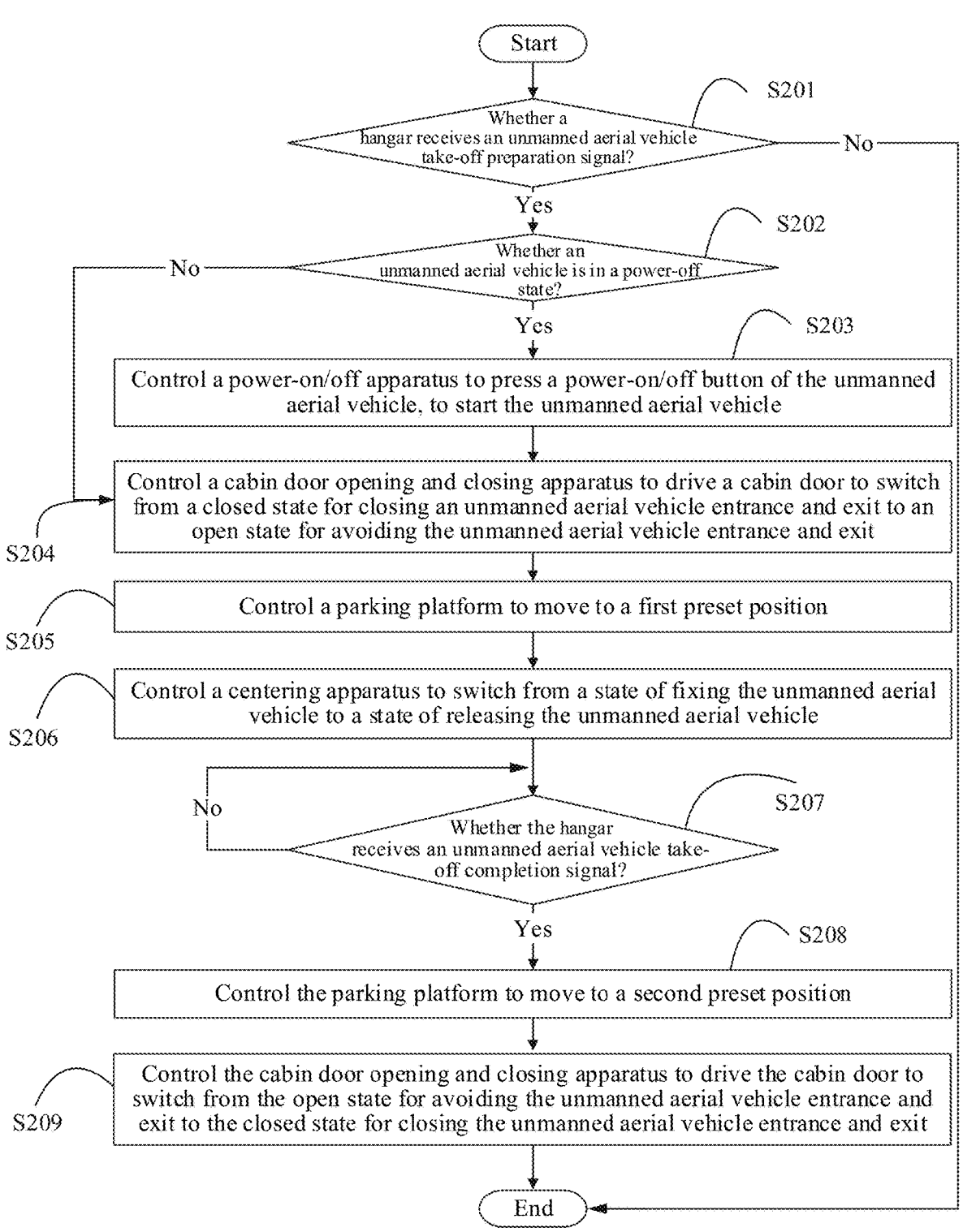
Figure 22:
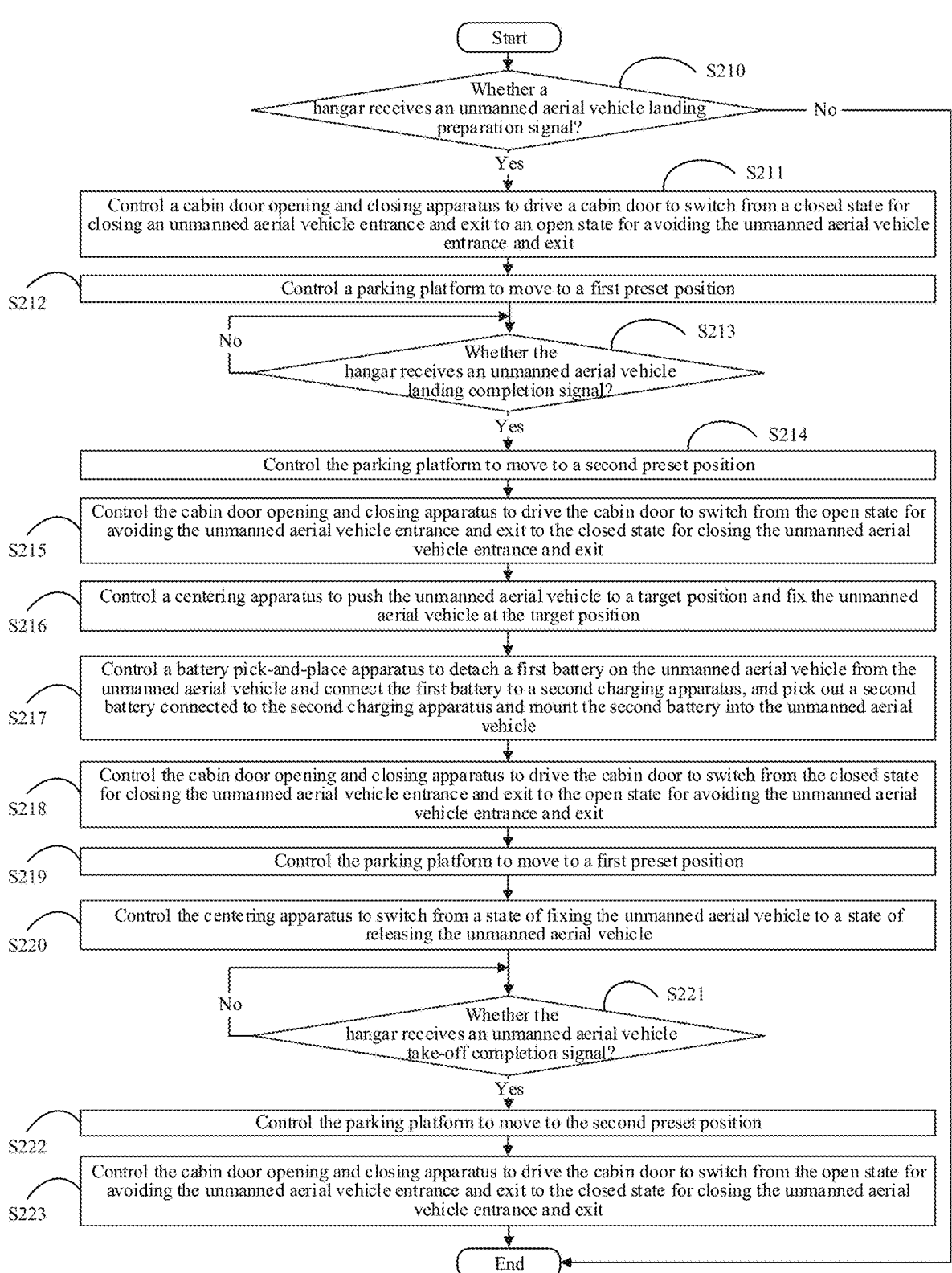
Figures 23, 24:
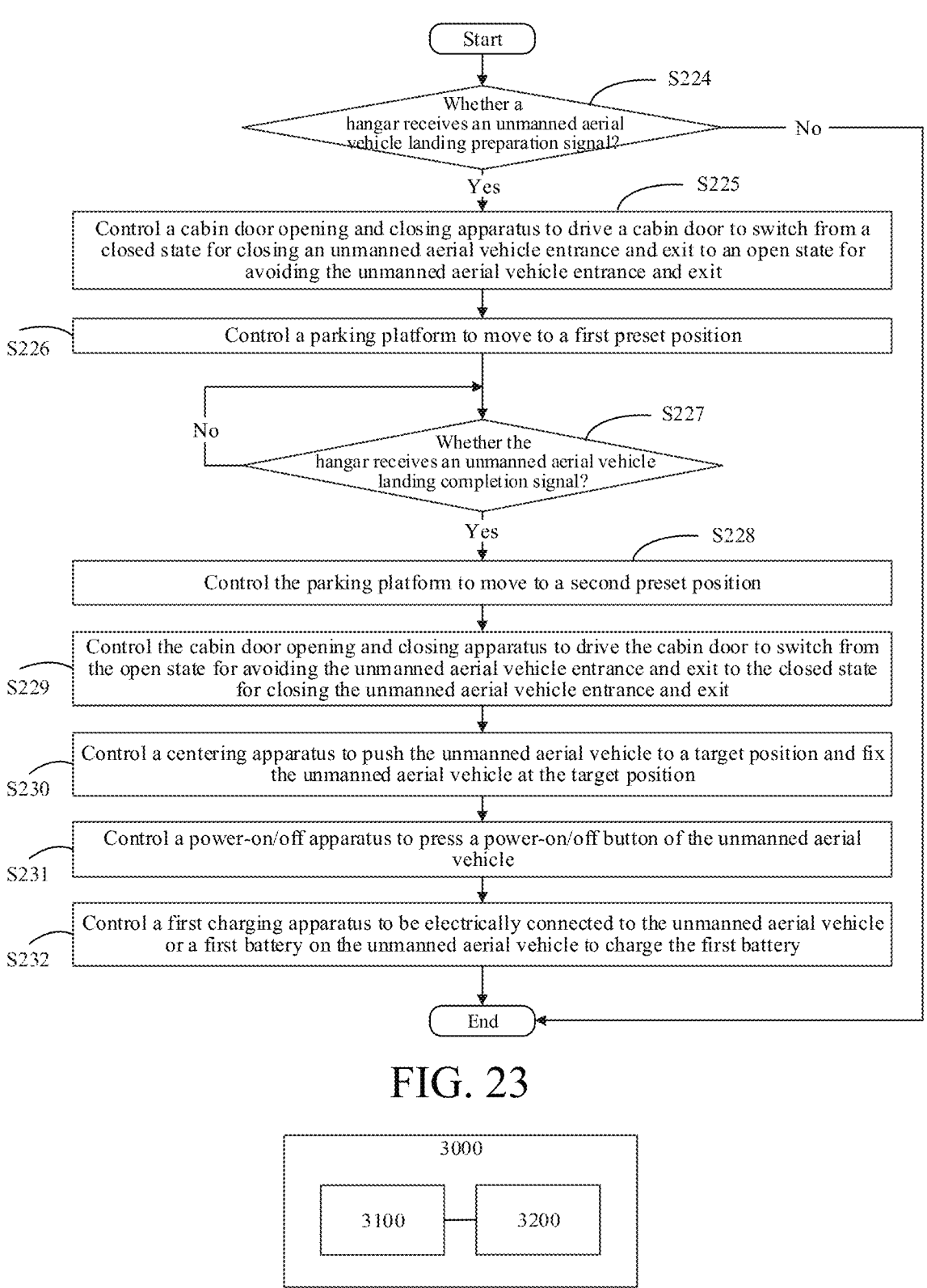

FIG. 14 is a schematic diagram of a second charging apparatus in a hangar according to an embodiment of the present disclosure;

FIG. 15 is a schematic diagram of a second charging apparatus in a hangar according to another embodiment of the present disclosure;

FIG. 16 is a schematic diagram of a parking platform and a centering apparatus in a hangar according to an embodiment of the present disclosure;

FIG. 17 is a partial enlarged view of a part A in FIG. 16;

FIG. 18 is a schematic diagram of cooperation between a centering apparatus in a hangar and an unmanned aerial vehicle according to an embodiment of the present disclosure;

FIG. 19 is a schematic diagram of a heat dissipation apparatus in a hangar according to an embodiment of the present disclosure;

FIG. 20 is a flowchart of a control method for a hangar according to an embodiment of the present disclosure;

FIG. 21 is a flowchart of a control method for a hangar according to an embodiment of the present disclosure;

FIG. 22 is a flowchart of a control method for a hangar according to an embodiment of the present disclosure;

FIG. 23 is a flowchart of a control method for a hangar according to an embodiment of the present disclosure; and FIG. 24 is a schematic diagram of a control device according to an embodiment of the present disclosure.

DETAILED DESCRIPTION

To make the technical problems resolved by the present disclosure, technical solutions, and advantageous effects clearer and more comprehensible, the following further describes the present disclosure in detail with reference to the accompanying drawings. It should be understood that the specific embodiments described herein are merely used to explain the present disclosure but are not intended to limit the present disclosure.

The embodiments of the present disclosure are described below in detail. Examples of the embodiments are shown in the accompanying drawings, and same or similar reference signs in all the accompanying drawings indicate same or similar components or components having same or similar functions.

In the descriptions of the present disclosure, it should be understood that orientation or position relationships indicated by the terms such as "center", "longitudinal", "transverse", "vertical", "length", "width", "above", "below", "front", "back", "left", "right", "vertical", "horizontal" "top", "bottom", "inside", and "outside" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of the present disclosure. An x axis is in a longitudinal direction, with a positive direction of the x axis being forward and a negative direction of the x axis being backward; a y axis is in a transverse direction, with a positive direction of the y axis being right and a negative direction of the y axis being left; a z axis is in a vertical direction, with a positive direction of the z axis being upward and a negative direction of the z axis being downward; and an xOy plane is a horizontal plane, an xOz plane is a vertical plane in a longitudinal direction, and a yOz plane is a vertical plane in a transverse direction. In addition, a feature defined to be "first" or "second" may explicitly or implicitly include one or more features. In the description of the present disclosure, unless stated otherwise, the meaning of "a plurality of" is two or more than two.

In the description of the present disclosure, it should be noted that unless otherwise explicitly specified or defined, the terms such as "mount", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in the present disclosure according to specific situations.

A hangar for an unmanned aerial vehicle in the related art can be transported to a designated position by a vehicle, and then the unmanned aerial vehicle can be released to perform related work (for example, exploration for work and shooting for entertainment). When a battery life of the unmanned aerial vehicle is insufficient, the unmanned aerial vehicle can be recovered and the battery life time can be supplemented by manual battery replacement or charging. With the development of technologies, considering a detection capability of a high degree of freedom of the unmanned aerial vehicle, currently, a solution in which the unmanned aerial vehicle can assist a driver in driving or even assist in self-driving by following the vehicle is designed. In addition, the unmanned aerial vehicle may further perform exploration or shooting over a larger area rather than being limited to an area centered on a specific position. However, if an unmanned aerial vehicle follows a vehicle while the vehicle is driving, the unmanned aerial vehicle cannot be charged manually or an unmanned aerial vehicle battery cannot be replaced manually without stopping the vehicle. A consumer-grade unmanned aerial vehicle commonly used in the related art generally has battery life time of only about 30 minutes. However, because driving time of a vehicle may be long or short, it is difficult to ensure that the battery life time of the unmanned aerial vehicle can cover the driving time of the vehicle as much as possible. In view of the foregoing reasons, the inventor improves the hangar for an unmanned aerial vehicle and proposes the technical solution disclosed in the present disclosure.

A hangar 1000 for an unmanned aerial vehicle, a vehicle 2000, a control method, a control device 3000, and a computer-readable storage medium provided in embodiments of the present disclosure are described in detail below with reference to FIG. 1 to FIG. 24.

Figure 1:
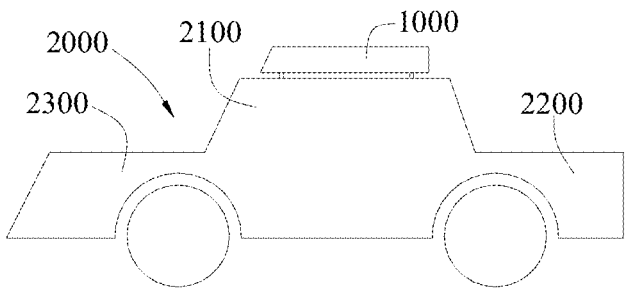
FIG. 1 is a schematic diagram of a vehicle and a hangar according to an embodiment of the present disclosure.

The vehicle 2000 provided in the embodiments of the present disclosure may be a sedan, a sport utility vehicle (SUV), a multi-purpose vehicle (MPV), a pickup truck, or the like, or may be a vehicle on which the hangar 1000 for an unmanned aerial vehicle can be mounted such as a fuel vehicle, a hybrid vehicle, or a pure electric vehicle. As shown in FIG. 1, the hangar 1000 may be arranged on a roof 2100, a rear cargo cabin 2200, or a front cargo cabin 2300 of the vehicle 2000. Considering that in a best-case scenario, the unmanned aerial vehicle takes off and lands in an environment without obstacles around, a good choice is to arrange the hangar 1000 on the roof 2100 of the vehicle 2000. In addition, the vehicle 2000 and the hangar 1000 are electrically and communicatively connected, so that the vehicle 2000 supplies power to the hangar 1000 and a driver can control the hangar 1000 in the vehicle 2000.

Figure 2:
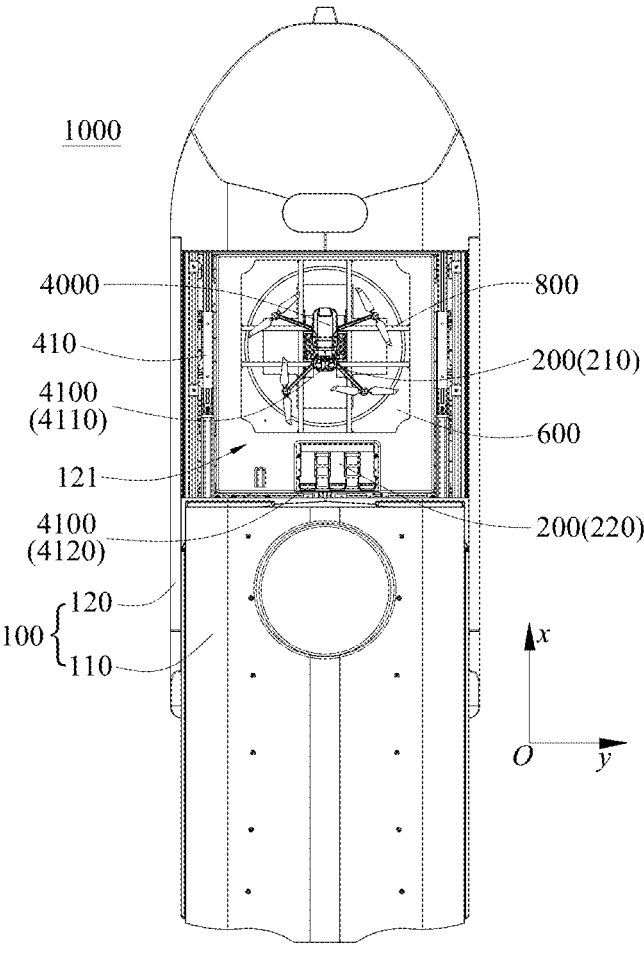
FIG. 2 is a schematic diagram of a hangar according to an embodiment of the present disclosure.
Figure 3:
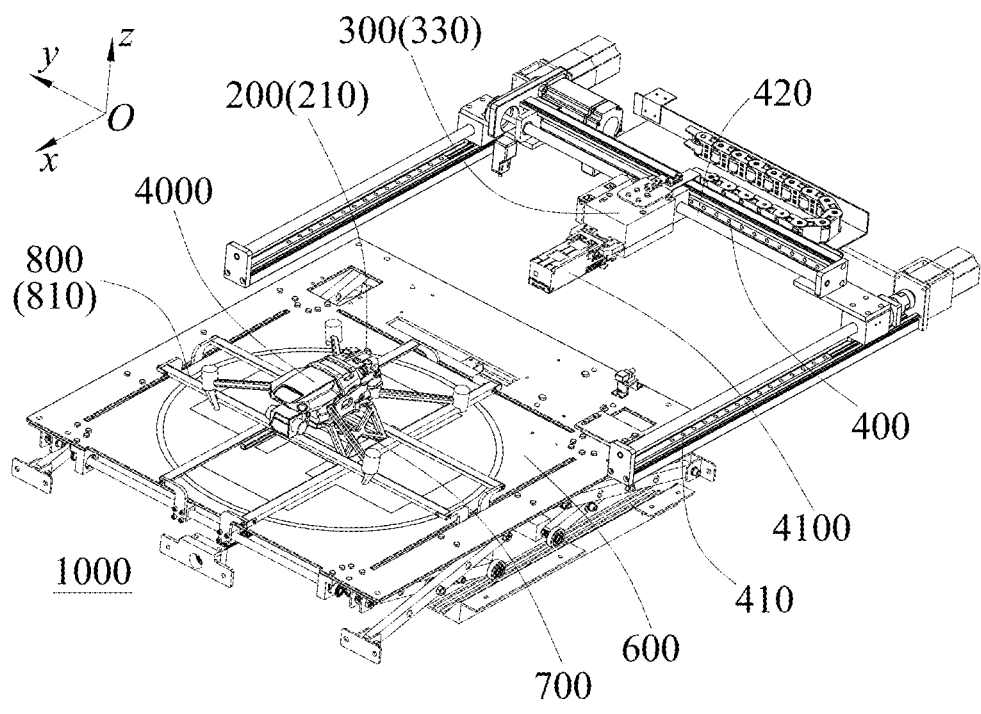
FIG. 3 is a schematic diagram of an internal structure of a hangar according to an embodiment of the present disclosure.

As shown in FIG. 2 and FIG. 3, the hangar 1000 includes a hangar body 100, a charging apparatus 200, and a battery pick-and-place apparatus 300. The hangar body 100 is configured to accommodate an unmanned aerial vehicle 4000. The charging apparatus 200 is arranged in the hangar body 100, and the charging apparatus 200 is configured to charge an unmanned aerial vehicle battery 4100. The unmanned aerial vehicle battery 4100 includes a first battery 4110 mounted on the unmanned aerial vehicle 4000 and/or a second battery 4120 outside the unmanned aerial vehicle 4000. The battery pick-and-place apparatus 300 is arranged in the hangar body 100, and the battery pick-and-place apparatus 300 is configured to detach the first battery 4110 from the unmanned aerial vehicle 4000 and/or mount the second battery 4120 into the unmanned aerial vehicle 4000.

It should be noted that, the first battery 4110 and the second battery 4120 are batteries of a same model, and both the first battery 4110 and the second battery 4120 are suitable for being mounted in the unmanned aerial vehicle 4000 and supplying power to the unmanned aerial vehicle 4000 during flight. In addition, the first battery 4110 and the second battery 4120 are definitions of the unmanned aerial vehicle battery 4100 at different positions. The unmanned aerial vehicle battery 4100 mounted on the unmanned aerial vehicle 4000 is the first battery 4110. After the unmanned aerial vehicle 4000 flies for a period of time, the first battery 4110 may be in a state of low power. The unmanned aerial vehicle battery 4100 located outside the unmanned aerial vehicle 4000 is the second battery 4120. For example, the second battery 4120 is placed in the hangar body 100, or is in a state of being electrically connected to the charging apparatus 200 in the hangar body 100. In other words, the second battery 4120 may be a backup battery with sufficient power, or even if the second battery 4120 is in low power, the second battery 4120 can continuously be charged in the hangar body 100 during flight of the unmanned aerial vehicle 4000.

According to the hangar 1000 for an unmanned aerial vehicle provided in the embodiments of the present disclosure, the first battery 4110 with insufficient power can be detached via the battery pick-and-place apparatus 300 and the second battery 4120 with sufficient power can be mounted into the unmanned aerial vehicle 4000 in a process in which the unmanned aerial vehicle briefly returns to the hangar 1000 when the vehicle 2000 drives for a long time and the unmanned aerial vehicle needs to continuously follow the vehicle, thereby quickly extending the battery life time of the unmanned aerial vehicle 4000, so that the unmanned aerial vehicle 4000 continues to follow the vehicle. After the vehicle 2000 finishes short-time driving, or when the vehicle is parked, or when the unmanned aerial vehicle 4000 does not need to follow the vehicle, the unmanned aerial vehicle 4000 can be returned to the hangar 1000 for standby, and the unmanned aerial vehicle battery 4100 can be charged by the charging apparatus 200, thereby stably and sustainably meeting a battery life requirement of the unmanned aerial vehicle 4000 for following the vehicle next time, and there is no need to stop the vehicle or manually replace or charge the battery in the entire process.

Figure 4:
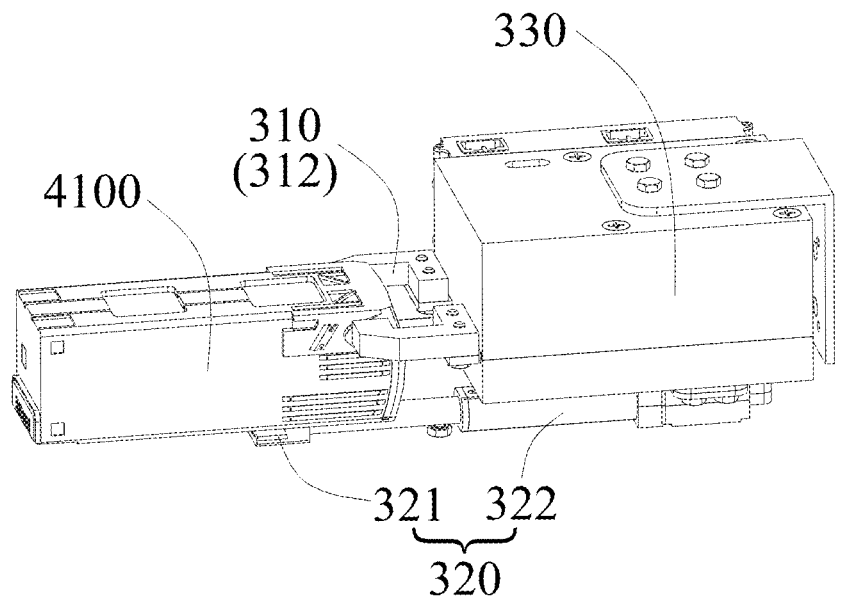
FIG. 4 is a schematic diagram of a battery pick-and-place apparatus in a hangar according to an embodiment of the present disclosure.

In some embodiments, as shown in FIG. 4, the battery pick-and-place apparatus 300 includes a clamping mechanism 310. The clamping mechanism 310 includes a first driving assembly 311 and two clamping members 312. The first driving assembly 311 is connected to at least one clamping member 312 to drive the at least one clamping member 312 to switch between a clamping state and a releasing state. When the clamping member 312 is in the clamping state, the two clamping members 312 are suitable for clamping the unmanned aerial vehicle battery 4100, and when the clamping member 312 is in the releasing state, the two clamping members 312 are suitable for detaching from the unmanned aerial vehicle battery 4100.

The clamping mechanism 310 drives the clamping members 312 to move through the first driving assembly 311, so that the clamping members 312 can switch between the clamping state and the releasing state. For example, when the battery pick-and-place apparatus 300 needs to detach the first battery 4110 on the unmanned aerial vehicle 4000, the clamping members 312 switch from the releasing state to the clamping state, and the clamping members 312 are clamped at corresponding positions of the first battery 4110, to implement disassembly of the first battery 4110. In other words, the first battery 4110 on the unmanned aerial vehicle 4000 or the second battery 4120 outside the unmanned aerial vehicle 4000 may be placed in the hangar body 100 or mounted on the unmanned aerial vehicle 4000 under clamping of the battery pick-and-place apparatus 300, to improve reliability of disassembly and assembly of the unmanned aerial vehicle battery 4100 on the unmanned aerial vehicle 4000 and reliability of disassembly and assembly of the unmanned aerial vehicle battery 4100 in the hangar body 100.

Figure 5:
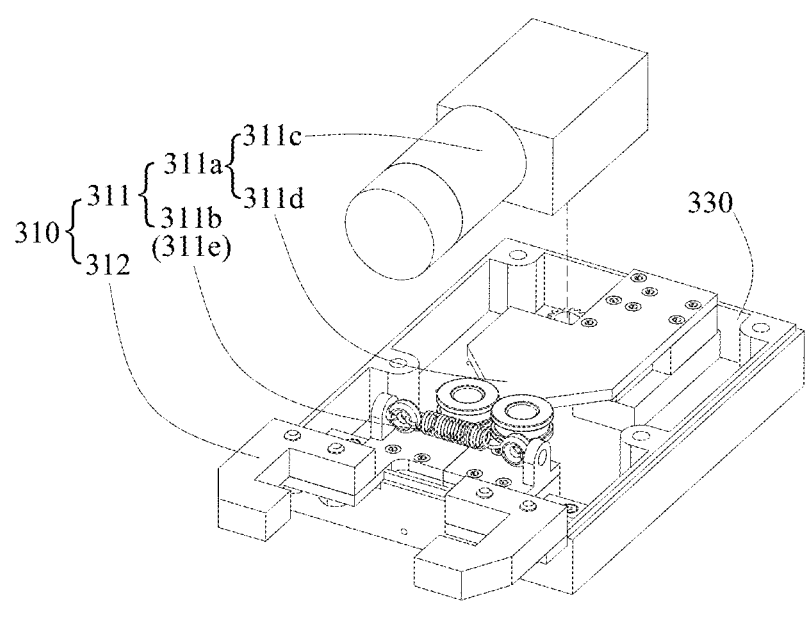
FIG. 5 is a schematic diagram of an internal structure of a battery pick-and-place apparatus in a hangar according to an embodiment of the present disclosure.

In some embodiments, as shown in FIG. 5, the first driving assembly 311 includes a first driving member 311*a*. The first driving member 311*a* is configured to drive the at least one clamping member 312 to enable the two clamping members 312 to move toward each other, so that the clamping members 312 switch from the releasing state to the clamping state, and the first driving member 311*a* is configured to drive the at least one clamping member 312 to enable the two clamping members 312 to move away from each other, so that the clamping members 312 switch from the clamping state to the releasing state. In some other embodiments, the first driving assembly 311 includes the first driving member 311*a* and a reset member 311*b*. One of the first driving member 311*a* and the reset member 311*b* is configured to drive the at least one clamping member 312 to enable the two clamping members 312 to move toward each other, so that the clamping members 312 switch from the releasing state to the clamping state, and the other of the first driving member 311*a* and the reset member 311*b* is configured to drive the at least one clamping member 312 to enable the two clamping members 312 to move away from each other, so that the clamping members 312 switch from the clamping state to the releasing state. Specifically, the first driving member 311*a* and the reset member 311*b* may also drive the two clamping members 312.

It may be understood that, the clamping state and the releasing state are not specifically limited in the present disclosure. The clamping state and the releasing state should be relative concepts, that is, a state of clamping the unmanned aerial vehicle battery 4100 is the clamping state, and both a disengagement process before clamping and a disengagement process after clamping should be understood as the releasing state. In other words, both a process in which the first driving assembly 311 drives the at least one clamping member 312 to enable the two clamping members 312 to move away from each other or move toward each other to gradually open a clamping space for clamping the unmanned aerial vehicle battery 4100, and a process in which the two clamping members 312 move away from each other or move toward each other to gradually shrink the clamping space for clamping the unmanned aerial vehicle battery 4100 should be understood as the releasing state. In an opening or shrinking adjustment process, until the clamping member 312 clamps the unmanned aerial vehicle battery 4100, the clamping member 312 switches to the clamping state.

In addition, a manner in which the clamping members 312 clamp and fix the unmanned aerial vehicle battery 4100 may be providing a clamping groove on the unmanned aerial vehicle battery 4100, and the two clamping members 312 move away from each other until the two clamping members 312 are pushed against two sides of the clamping groove to fix the unmanned aerial vehicle battery 4100, or may be providing clamping grooves on the unmanned aerial vehicle battery 4100, and the two clamping members 312 respectively extend into the corresponding clamping groove. In addition, the unmanned aerial vehicle battery 4100 is clamped by the two clamping members 312 in a width direction, a length direction, or a height direction of the unmanned aerial vehicle battery 4100.

Figure 6:
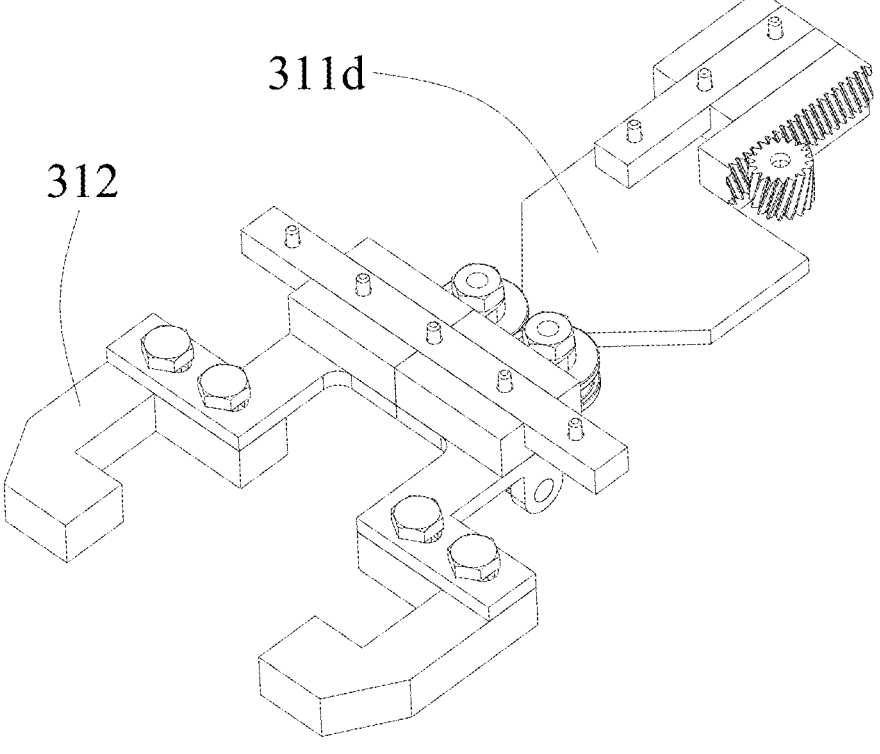
FIG. 6 is a schematic diagram of an internal structure of a battery pick-and-place apparatus in a hangar according to an embodiment of the present disclosure.

In some embodiments, as shown in FIG. 5 and FIG. 6, the first driving member 311a includes a first power unit 311c and a first transmission unit 311d, and the first power unit 311c is connected to at least one clamping member 312 via the first transmission unit 311d. The reset member 311b includes a first elastic unit 311e, and the first elastic unit 311e is connected to the at least one clamping member 312. In some embodiments, the first power unit 311c is a motor or a pressure pump. The first transmission unit 311d is one or more of a connecting rod mechanism, a gear mechanism, a thrust sliding mechanism, a hydraulic mechanism, a pneumatic mechanism, and a screw mechanism. The first elastic unit 311e is a spring.

Figure 7:
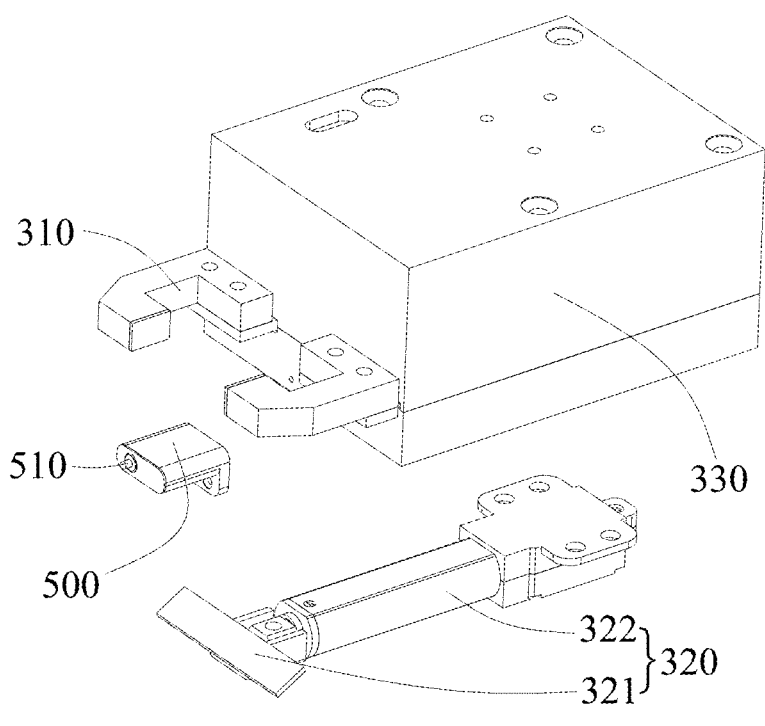
FIG. 7 is a partial exploded view of a battery pick-and-place apparatus and a power-on/off apparatus in a hangar according to an embodiment of the present disclosure.
Figure 8:
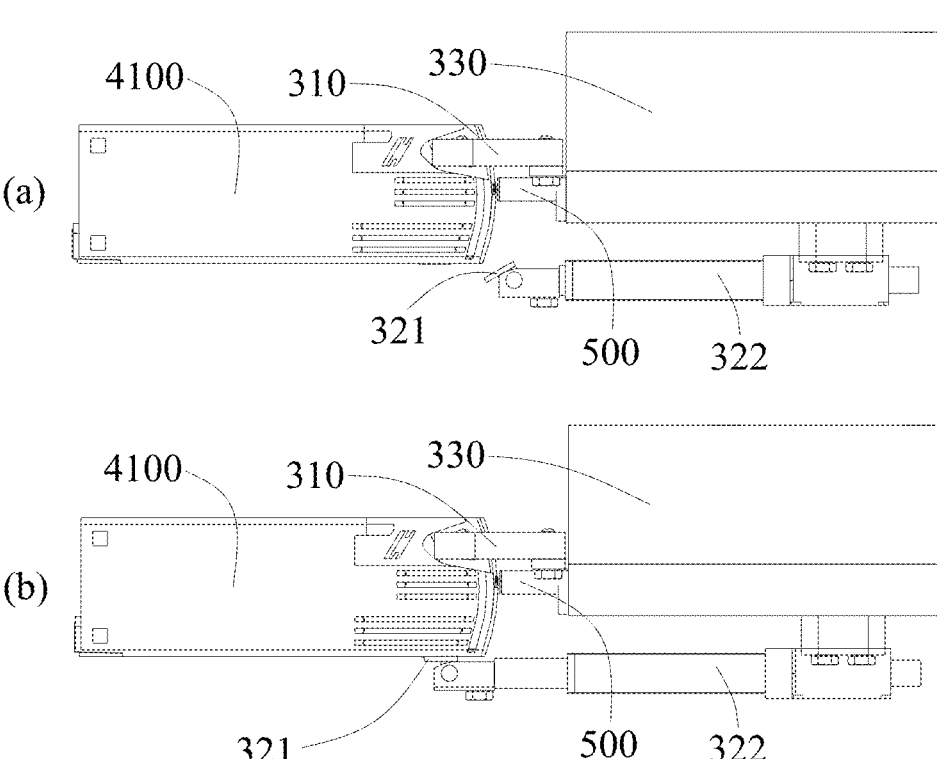
FIG. 8 is a schematic diagram of two states of a battery pick-and-place apparatus in a hangar according to an embodiment of the present disclosure.

In some embodiments, as shown in FIG. 4, FIG. 7, and FIG. 8, the battery pick-and-place apparatus 300 includes a lifting mechanism 320, and the lifting mechanism 320 is suitable for cooperating with a bottom surface of the unmanned aerial vehicle battery 4100 to support the unmanned aerial vehicle battery 4100.

It should be noted that, for the unmanned aerial vehicle 4000, an opening of a battery mounting groove is provided on a side portion. The unmanned aerial vehicle battery 4100 is generally constructed as a strip-shaped battery. In this case, an initial contact position between the battery pick-and-place apparatus 300 and the unmanned aerial vehicle battery 4100 may only be a side end portion of the unmanned aerial vehicle battery 4100 away from the unmanned aerial vehicle 4000. Because there is a specific distance between a center of gravity and the side end portion of the unmanned aerial vehicle battery 4100, if the battery pick-and-place apparatus 300 only applies a force to the side end portion of the unmanned aerial vehicle battery 4100, the unmanned aerial vehicle battery 4100 easily flips or slides around the side end portion. Based on this, the lifting mechanism 320 is arranged on the battery pick-and-place apparatus 300, to cooperate with a bottom surface of the unmanned aerial vehicle battery 4100 and support the unmanned aerial vehicle battery 4100, so as to ensure stability of a posture of the unmanned aerial vehicle battery 4100 when the battery pick-and-place apparatus 300 picks and places the unmanned aerial vehicle battery 4100, and prevent the unmanned aerial vehicle battery 4100 from flipping or sliding, thereby improving accuracy of mounting, by the battery pick-and-place apparatus 300, the unmanned aerial vehicle battery 4100 into the unmanned aerial vehicle 4000 or the hangar body 100.

In some embodiments, as shown in FIG. 4, FIG. 7, and FIG. 8, the battery pick-and-place apparatus 300 further includes a base 330, and the clamping mechanism 310 and/or the lifting mechanism 320 are/is arranged on the base 330.

In some embodiments, as shown in FIG. 4, FIG. 7, and FIG. 8, the lifting mechanism 320 includes a lifting member 321. The lifting member 321 may switch between a protruding position suitable for cooperating with the bottom surface of the unmanned aerial vehicle battery 4100 and a retracted position below the base 330, to avoid the lifting mechanism 320 from interfering with other structures in the hangar 1000 when the unmanned aerial vehicle battery 4100 does not need to be supported. In some other embodiments, the lifting member 321 may also be always at the protruding position.

In some embodiments, as shown in FIG. 4, FIG. 7, and FIG. 8, the lifting mechanism 320 further includes a lifting push rod 322. The lifting push rod 322 is movably or retractably arranged on the base 330, and a free end of the lifting push rod 322 is connected to the lifting member 321 to drive the lifting member 321 to switch between the protruding position and the retracted position.

In some embodiments, as shown in FIG. 8, the lifting member 321 is rotatably arranged on the lifting push rod 322, and when lifting the unmanned aerial vehicle battery 4100, the lifting member 321 is attached to a lower surface of the unmanned aerial vehicle battery 4100, and the lifting member 321 is tilted in a natural state. In other words, an axial hole or an adapter plate can be provided on the free end of the lifting push rod 322, the axial hole is provided on the adapter plate, and a rotating shaft is arranged on the lifting member 321. The rotating shaft is mounted to the axial hole, so that the lifting member 321 can rotate relative to the lifting push rod 322. In this way, the lifting member 321 can switch between an inclined position with an angle to a horizontal plane and a horizontal position substantially parallel to the horizontal plane. An angle between the lifting member 321 at the inclined position and the horizontal plane can range from 15° to 20°. As shown in FIG. 8(*b*), in a process in which the lifting member 321 moves toward the unmanned aerial vehicle battery 4100 along with the lifting push rod 322 or the base 330, the lifting member 321 gradually comes into contact with the bottom surface of the unmanned aerial vehicle battery 4100, and flips from the inclined position to the horizontal position to lift the unmanned aerial vehicle battery 4100. As shown in FIG. 8(*a*), in a process in which the lifting member 321 moves away from the unmanned aerial vehicle battery 4100 along with the lifting push rod 322 or the base 330, the lifting member 321 can gradually move away from the unmanned aerial vehicle battery 4100 and restore the inclined position. The lifting member 321 is set to a rotatable structure, to avoid a problem that the lifting member 321 cannot cooperate well with the bottom surface of the unmanned aerial vehicle battery 4100 due to misalignment with the bottom surface of the unmanned aerial vehicle battery 4100 in a battery pick-and-place process, thereby improving battery replacement stability of the battery pick-and-place apparatus 300.

In some embodiments, a buffer layer may be arranged on a side surface of the lifting member 321 facing the unmanned aerial vehicle battery 4100. Further, an anti-slip texture may be set on the buffer layer to improve stability of lifting the unmanned aerial vehicle battery 4100 and provide a buffer for the unmanned aerial vehicle battery 4100.

Figure 9:
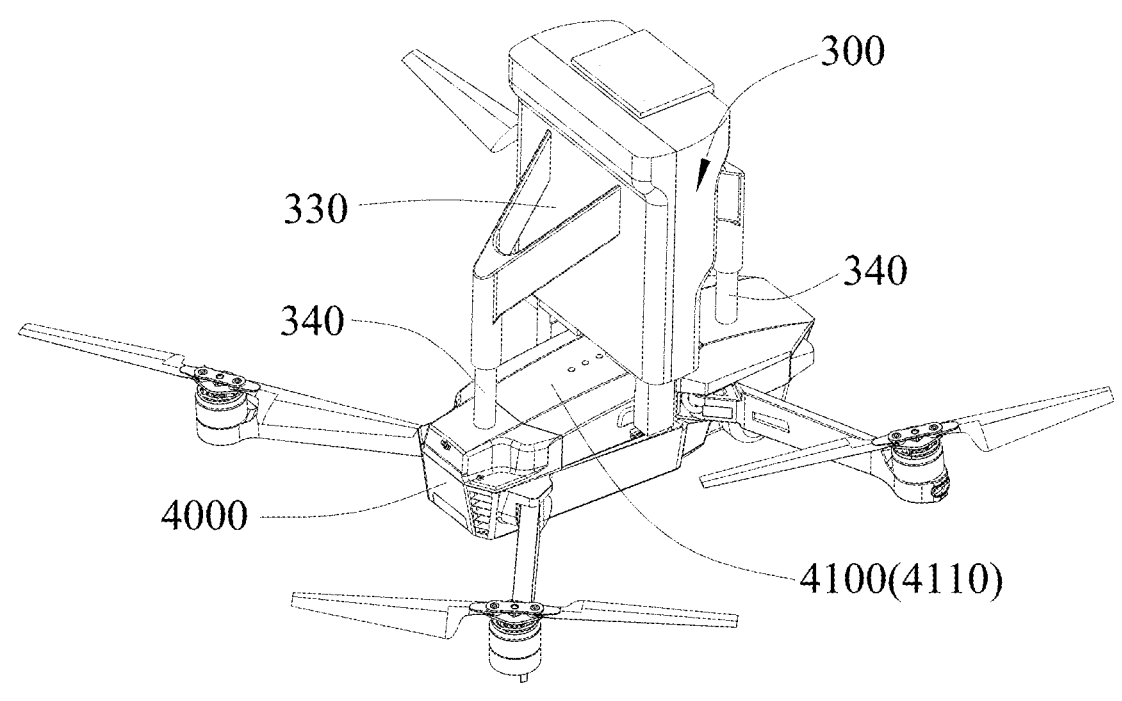
FIG. 9 is a schematic diagram of a battery pick-and-place apparatus in a hangar according to another embodiment of the present disclosure.

In some other embodiments, as shown in FIG. 9, the battery pick-and-place apparatus 300 includes a pressing mechanism 340, and the pressing mechanism 340 is suitable for cooperating with a top surface of the unmanned aerial vehicle 4000 to press a body of the unmanned aerial vehicle 4000.

It should be noted that, for the unmanned aerial vehicle 4000, an opening of a battery mounting groove is provided at a top portion. The battery pick-and-place apparatus 300 needs to apply an upward force to the unmanned aerial vehicle battery 4100 when picking out the unmanned aerial vehicle battery 4100 from the unmanned aerial vehicle 4000. However, because there is a specific connection force between the unmanned aerial vehicle battery 4100 and the body of the unmanned aerial vehicle 4000, and the body of the unmanned aerial vehicle 4000 is relatively light in weight, the body of the unmanned aerial vehicle 4000 may be lifted together with the unmanned aerial vehicle battery 4100, and there is a risk that the body of the unmanned aerial vehicle 4000 falls in this process. Based on this, the pressing mechanism 340 is arranged on the battery pick-and-place apparatus 300, to press a top surface of the body of the unmanned aerial vehicle 4000 when the battery pick-and-place apparatus 300 picks out the unmanned aerial vehicle battery 4100 from the unmanned aerial vehicle 4000, thereby ensuring the stability of the posture of the unmanned aerial vehicle 4000 and preventing the unmanned aerial vehicle 4000 from falling and being damaged after being lifted.

In some embodiments, as shown in FIG. 9, there are at least two pressing mechanisms 340, and the at least two pressing mechanisms 340 are spaced apart from each other. Multiple pressing mechanisms 340 form multi-point pressing on the body of the unmanned aerial vehicle 4000, thereby improving stability of the pressing. In some embodiments, the pressing mechanism 340 is arranged on the base 330, and the pressing mechanism 340 can move or retract in a vertical direction relative to the base 330. For example, the pressing mechanism 340 has a spring piston structure. When the pressing mechanism 340 comes into contact with the body of the unmanned aerial vehicle 4000 and makes a spring of the pressing mechanism 340 in a compressed state, a pressing force is applied to the body of the unmanned aerial vehicle 4000.

In some embodiments, as shown in FIG. 3, the hangar 1000 further includes a movable rack 400. The movable rack 400 is movably arranged in the hangar body 100, and the battery pick-and-place apparatus 300 is arranged on the movable rack 400. The battery pick-and-place apparatus 300 is arranged on the movable rack 400, so that the battery pick-and-place apparatus 300 drives, in a manner of movement, the first battery 4110 to be separated from the body of the unmanned aerial vehicle 4000 and drives the second battery 4120 to be mounted into the body of the unmanned aerial vehicle 4000.

In some embodiments, the movable rack 400 is movably arranged in the hangar body 100 along a first direction, and the battery pick-and-place apparatus 300 is movably arranged on the movable rack 400 along a second direction. The first direction is not parallel to the second direction, and the first direction and the second direction each have the component in the horizontal plane direction.

In some embodiments, as shown in FIG. 3, a first movable guide rail 410 is arranged in the hangar body 100, the first movable guide rail 410 extends along the first direction, and the movable rack 400 is movably arranged on the first movable guide rail 410 along the first direction. A second movable guide rail 420 is arranged on the movable rack 400, the second movable guide rail 420 extends along the second direction, and the battery pick-and-place apparatus 300 is movably arranged on the second movable guide rail 420 along the second direction via the base 330. In some embodiments, the first direction and the second direction are perpendicular to each other, and both the first direction and the second direction extend in the horizontal plane direction. Further, the first direction is a front-rear direction of the hangar 1000, and the second direction is a left-right direction of the hangar 1000.

In some embodiments, as shown in FIG. 7 and FIG. 8, the hangar 1000 further includes a power-on/off apparatus 500, and the power-on/off apparatus 500 is arranged in the hangar body 100. The power-on/off apparatus 500 is switchable between a trigger state and an avoidance state, when the power-on/off apparatus 500 is in the trigger state, the power-on/off apparatus 500 is suitable for pressing a power-on/off button of the unmanned aerial vehicle 4000, and when the power-on/off apparatus 500 is in the avoidance state, the power-on/off apparatus 500 is suitable for being separated from the power-on/off button or skips applying a force to the power-on/off button. The power-on/off button of the unmanned aerial vehicle 4000 may be a button that is responsible for both power-on and power off, or may include a power-on button and a power-off button.

It should be noted that, most of the unmanned aerial vehicle products in the related art do not allow remote start-up. The unmanned aerial vehicle can only be turned on and turned off by a user manually triggering the power-on/off button on the unmanned aerial vehicle. Therefore, if the unmanned aerial vehicle needs to meet a requirement of following the vehicle at any time, the unmanned aerial vehicle needs to be kept in a start-up standby state for a long time, which will affect a battery life capability of the unmanned aerial vehicle. According to the hangar 1000 provided in the embodiments of the present disclosure, the power-on/off apparatus 500 is arranged, so that a hard start can be performed by pressing the power-on/off button of the unmanned aerial vehicle 4000 when the unmanned aerial vehicle 4000 is required to operate, and a hard shutdown can be performed by pressing the power-on/off button of the unmanned aerial vehicle 4000 when the unmanned aerial vehicle 4000 is not required to operate, thereby avoiding unnecessary power consumption and improving the battery life capability of the unmanned aerial vehicle 4000.

Figure 10:
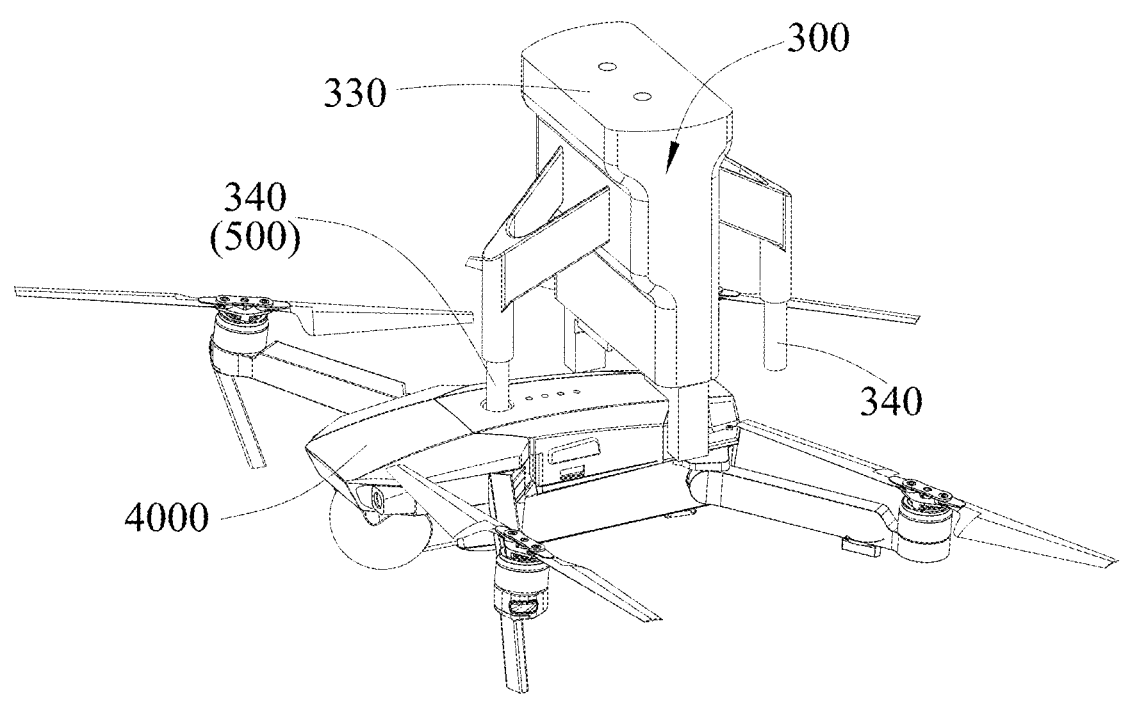
FIG. 10 is a schematic diagram of a battery pick-and-place apparatus in a hangar according to another embodiment of the present disclosure.

In some other embodiments, as shown in FIG. 10, the pressing mechanism 340 may be formed as the power-on/off apparatus 500. That is, the battery pick-and-place apparatus 300 can enable, in a manner of movement, the pressing mechanism 340 to switch between the trigger state and the avoidance state. When the pressing mechanism 340 is in the trigger state, the pressing mechanism 340 is suitable for pressing the power-on/off button of the unmanned aerial vehicle 4000, and when the pressing mechanism 340 is in the avoidance state, the pressing mechanism 340 is suitable for being separated from the power-on/off button or skips applying a force to the power-on/off button.

In some embodiments, as shown in FIG. 7 and FIG. 8, the power-on/off apparatus 500 is arranged on the base 330 of the battery pick-and-place apparatus 300 and moves with the base 330, so that the power-on/off apparatus 500 comes into contact with the power-on/off button of the unmanned aerial vehicle 4000 in a manner of movement to perform a hard start or a hard shutdown on the unmanned aerial vehicle 4000.

In some embodiments, as shown in FIG. 7, the power-on/off apparatus 500 includes a trigger member 510, and a length of the trigger member 510 is retractable. The trigger member 510 can press the power-on/off button through extending movement and can be separated from the power-on/off button through shortening movement, or the trigger member 510 is movably arranged on the base 330, and the trigger member 510 can press the power-on/off button by moving close to the power-on/off button and can be separated from the power-on/off button by moving away from the power-on/off button. According to the hangar 1000 provided in the embodiments of the present disclosure, the trigger member 510 of the power-on/off apparatus 500 is set to be a retractable or movable structure, so that a contact manner between the power-on/off apparatus 500 and the power-on/off button of the unmanned aerial vehicle 4000 is more flexibly adjusted.

In some embodiments, as shown in FIG. 2 and FIG. 3, the charging apparatus 200 includes a first charging apparatus 210. The first charging apparatus 210 is configured to charge the first battery 4110 mounted on the unmanned aerial vehicle 4000 by connecting to the unmanned aerial vehicle 4000 or the first battery 4110. After the vehicle 2000 finishes short-time driving, or when the vehicle is parked, or when the unmanned aerial vehicle 4000 does not need to follow the vehicle, the unmanned aerial vehicle 4000 can be returned to the hangar 1000 for standby, and the first charging apparatus 210 is directly electrically connected to the first battery 4110 on the unmanned aerial vehicle 4000 or the charging interface of the unmanned aerial vehicle 4000 to charge the first battery 4110 on the unmanned aerial vehicle 4000, thereby stably and sustainably meeting a battery life requirement of the unmanned aerial vehicle 4000 for following the vehicle next time.

Figure 11:
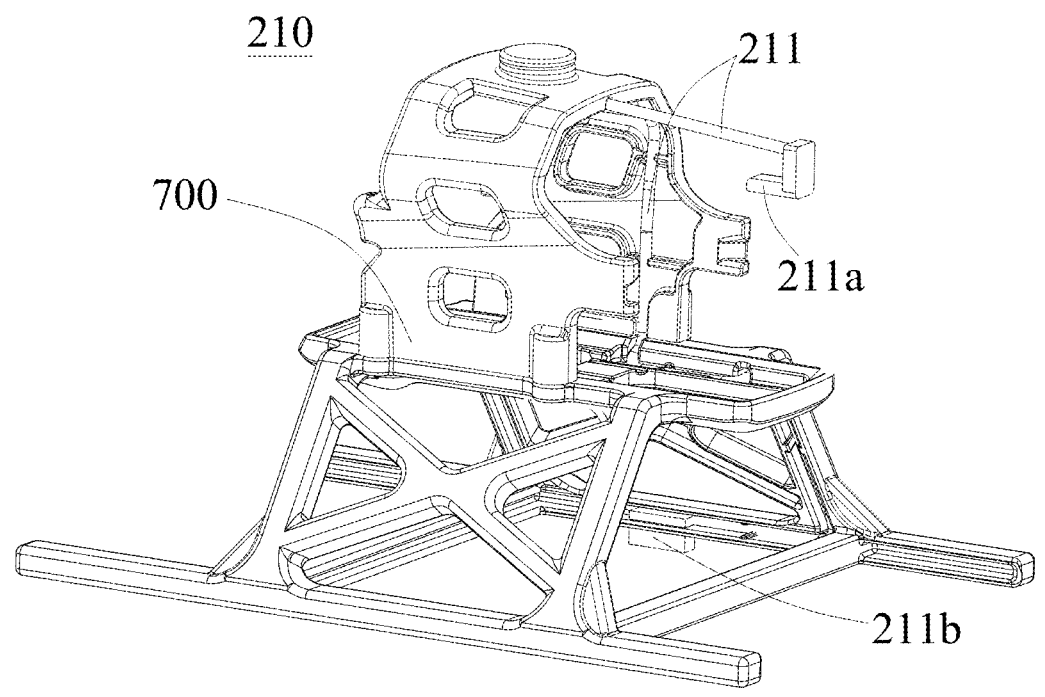
FIG. 11 is a schematic diagram of a first charging apparatus in a hangar according to an embodiment of the present disclosure.
Figure 12:
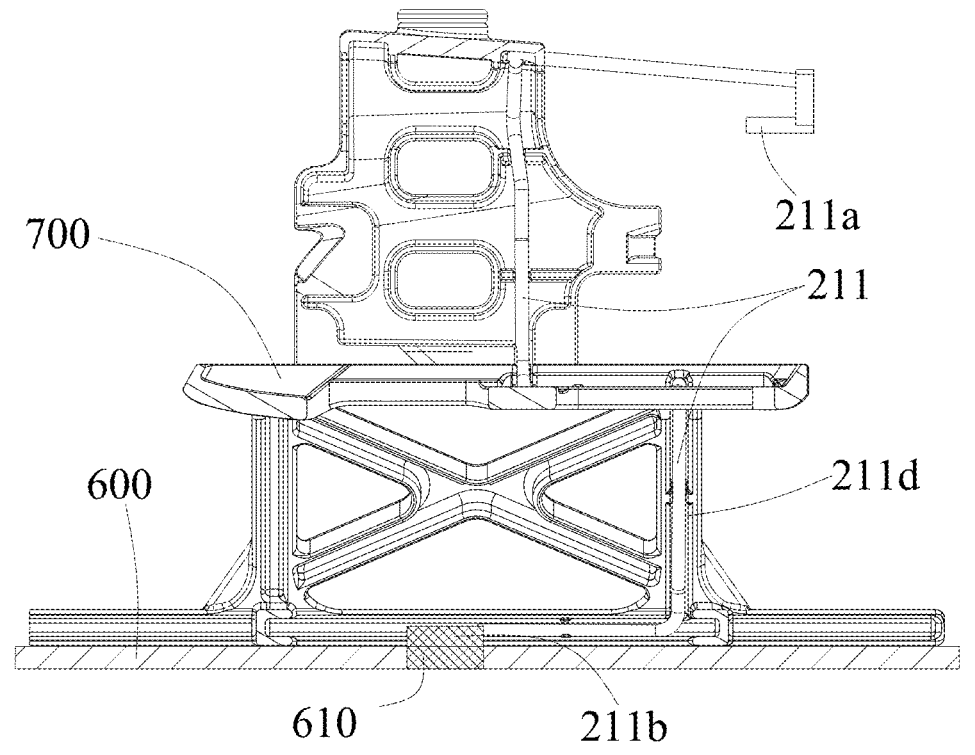
FIG. 12 is a cross-sectional view of a first charging apparatus in a hangar according to an embodiment of the present disclosure.

In some embodiments, as shown in FIG. 11 and FIG. 12, the hangar 1000 further includes a parking platform 600. The parking platform 600 is configured to park the unmanned aerial vehicle 4000. The first charging apparatus 210 includes an unmanned aerial vehicle rack 700 and an electrical connecting wire 211. The unmanned aerial vehicle rack 700 is mounted on the unmanned aerial vehicle 4000, can fly together with the unmanned aerial vehicle 4000, and is suitable for being parked on the parking platform 600 and supporting the unmanned aerial vehicle 4000. The electrical connecting wire 211 is arranged on the unmanned aerial vehicle rack 700, and a first fitting portion 211*a* and a second fitting portion 211*b* are arranged. The first fitting portion 211*a* is suitable for being electrically connected to the charging interface of the unmanned aerial vehicle 4000 or the first battery 4110, and the second fitting portion 211*b* is suitable for being electrically connected to the power supply interface 610 of the parking platform 600. According to the hangar 1000 provided in the embodiments of the present disclosure, when the unmanned aerial vehicle 4000 is parked on the parking platform 600 via the unmanned aerial vehicle rack 700, the electrical connecting wire 211 can connect the power supply interface 610 of the parking platform 600 with the charging interface of the unmanned aerial vehicle 4000 or the first battery 4110, to implement automatic charging of the unmanned aerial vehicle 4000 on the parking platform 600, thereby eliminating an operation of charging the first battery 4110 and improving user experience.

In some embodiments, as shown in FIG. 12, a wiring channel 710 is provided on the unmanned aerial vehicle rack 700, the wiring channel 710 extends to a bottom portion of the unmanned aerial vehicle rack 700, the electrical connecting wire 211 is arranged in the wiring channel 710, and the second fitting portion 211*b* is connected to the bottom portion of the unmanned aerial vehicle rack 700. The wiring channel 710 can be configured to fix the electrical connecting wire 211 and control a direction of the electrical connecting wire 211, to prevent the electrical connecting wire 211 from loosening and shaking. The wiring channel 710 can be provided on one side of the inside of the unmanned aerial vehicle rack 700, to reduce exposure of the electrical connecting wire 211 and implement hiding of the electrical connecting wire 211, which helps reduce an impact of the electrical connecting wire 211 on performance and aesthetics of the unmanned aerial vehicle 4000 and improve a service life of the electrical connecting wire 211.

Figure 13:
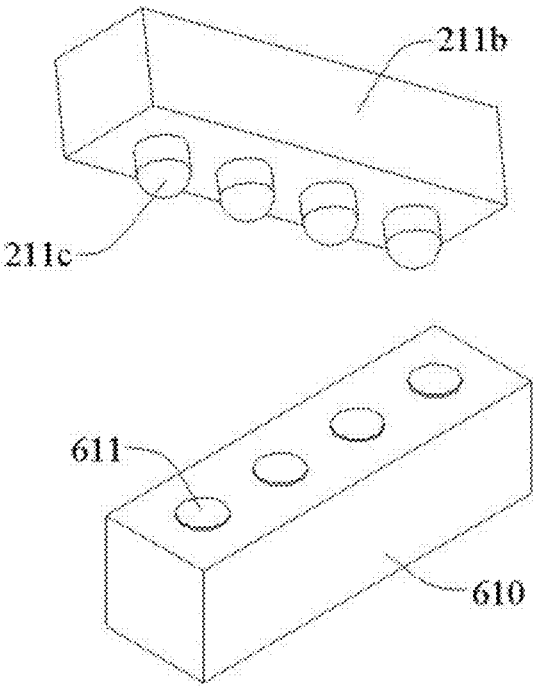
FIG. 13 is a schematic diagram of a second fitting portion of a first charging apparatus and a power supply interface of a parking platform in a hangar according to an embodiment of the present disclosure.

In some embodiments, as shown in FIG. 13, the second fitting portion 211*b* includes a contact convex point 211*c*, a contact groove 611 is provided on the power supply interface 610, and the contact convex point 211*c* is suitable for extending into the contact groove 611 to enable the second fitting portion 211*b* to be electrically connected to the power supply interface 610. A mounting channel (not shown in the figure) is provided in the second fitting portion 211*b*, a second elastic unit (not shown in the figure) is arranged in the mounting channel, the contact convex point 211*c* is at least partially arranged in the mounting channel and cooperates with the second elastic unit, and the second elastic unit applies a force toward the contact convex point 211*c* to enable the contact convex point 211*c* to have a tendency to extend out of the mounting channel. After the unmanned aerial vehicle 4000 lands, when the second fitting portion 211*b* is not aligned with and does not cooperate with the contact groove 611, the contact convex point 211*c* can further enable the second elastic unit to be compressed under an impact of influence of gravity of the unmanned aerial vehicle 4000 and the unmanned aerial vehicle rack 700, and the contact convex point 211*c* retracts into the mounting channel, so that the unmanned aerial vehicle 4000 stops steadily. When the second fitting portion 211*b* is aligned with and cooperates with the contact groove 611, the contact convex point 211*c* can extend out of the mounting channel under the force of the second elastic unit and extend out of the mounting channel to abut against the contact groove 611, thereby improving reliability of an electrical connection between the contact convex point 211*c* and the contact groove 611 and avoiding a problem of false connection.

In some embodiments, as shown in FIG. 14, the battery charging apparatus 200 includes the second charging apparatus 220. The second charging apparatus 220 is configured to charge the second battery 4120 outside the unmanned aerial vehicle 4000 by connecting to the second battery 4120. When the second battery 4120 is placed in the hangar body 100, the second battery 4120 is continuously charged by being electrically connected to the second charging apparatus 220, so that the second battery 4120 can also be continuously charged during the flight of the unmanned aerial vehicle 4000. In this way, when the first battery 4110 on the unmanned aerial vehicle 4000 is low on power, the first battery 4110 can be replaced with the second battery 4120 with sufficient power, thereby stably and sustainably increasing the battery life time of the unmanned aerial vehicle 4000. Specifically, a process of replacing a battery of the unmanned aerial vehicle 4000 is as follows. The battery pick-and-place apparatus 300 is configured to connect the first battery 4110 to the second charging apparatus 220 after detaching the first battery 4110 from the unmanned aerial vehicle 4000, and mount the second battery 4120 into the unmanned aerial vehicle 4000 after picking out the second battery 4120 connected to the second charging apparatus 220.

In some embodiments, as shown in FIG. 14, the second charging apparatus 220 includes multiple charging grooves 221, the charging grooves 221 are fixedly provided in the hangar body 100, insertion ports 221*a* are provided on the charging grooves 221, and the second battery 4120 is suitable for being inserted into the charging grooves 221 through the insertion ports 221*a* for charging. In some embodiments, multiple through holes 221*b* for heat dissipation are provided on the charging grooves 221.

In some embodiments, as shown in FIG. 14, multiple charging grooves 221 are provided side by side, and the insertion ports 221*a* of the multiple charging grooves 221 are oriented in a same direction, so that it is convenient for the battery pick-and-place apparatus 300 to place the unmanned aerial vehicle battery 4100 into the charging grooves 221 and pick out the unmanned aerial vehicle battery 4100 from the charging grooves 221. Further, the insertion ports 221*a* of the multiple charging grooves 221 can be oriented toward a parking area of the unmanned aerial vehicle 4000, to shorten a moving distance of the battery pick-and-place apparatus 300 in a battery replacement process, thereby improving battery replacement efficiency. Among the multiple charging grooves 221, adjacent charging grooves 221 are spaced apart to improve a heat dissipation effect; or adjacent charging grooves 221 are closely provided, to improve spatial compactness of the hangar 1000. In some other embodiments, the insertion ports 221*a* of the multiple charging grooves 221 may also be oriented toward a direction away from the parking area of the unmanned aerial vehicle 4000.

In some other embodiments, as shown in FIG. 15, multiple charging grooves 221 are circumferentially spaced apart around a vertical axis, and the insertion ports 221*a* of the multiple charging grooves 221 are oriented away from the vertical axis. In other words, the insertion ports 221*a* of the multiple charging grooves 221 face outward, so that it is convenient for the battery pick-and-place apparatus 300 to place the unmanned aerial vehicle battery 4100 into the charging grooves 221. Further, the multiple charging grooves 221 may be provided on a rotating platform 222. The rotating platform 222 is rotatably arranged in the hangar body 100 around a vertical axis. The rotating platform 222 is rotated, so that when the battery pick-and-place apparatus 300 picks out the first battery 4110 from the unmanned aerial vehicle 4000, the insertion ports 221*a* of the charging grooves 221 that are not connected to the unmanned aerial vehicle battery 4100 can be rotated to face the unmanned aerial vehicle 4000. Then the battery pick-and-place apparatus 300 mounts the first battery 4110 into the charging grooves 221, and then rotates the insertion ports 221*a* of the charging grooves 221 connected to the second battery 4120 with sufficient power to face the unmanned aerial vehicle 4000. Finally, the battery pick-and-place apparatus 300 picks out the second battery 4120 from the charging grooves 221 and mounts the second battery 4120 into the unmanned aerial vehicle 4000, thereby greatly shortening the moving distance of the battery pick-and-place apparatus 300 in the battery replacement process.

In some embodiments, as shown in FIG. 16, the hangar 1000 further includes a centering apparatus 800, and the centering apparatus 800 is arranged in the hangar body 100. The centering apparatus 800 is suitable for pushing the unmanned aerial vehicle 4000 to the target position and fixing the unmanned aerial vehicle 4000 at the target position. The battery pick-and-place apparatus 300 is configured to detach the first battery 4110 from the unmanned aerial vehicle 4000 located at the target position and/or mount the second battery 4120 into the unmanned aerial vehicle 4000 located at the target position. A position of the first battery 4110 on the unmanned aerial vehicle 4000 is abstracted as coordinates, and the coordinates are set as a mobile node of the battery pick-and-place apparatus 300, so that a control strategy can be greatly simplified. In addition, to ensure that battery replacement can be successfully completed by an operation performed when the battery pick-and-place apparatus 300 moves to the coordinates, it needs to ensure that the unmanned aerial vehicle 4000 can be stably positioned at the target position. According to the hangar 1000 provided in the embodiments of the present disclosure, the centering apparatus 800 is arranged, to push the unmanned aerial vehicle 4000 back to the target position and fix the unmanned aerial vehicle 4000 at the target position, so that the battery pick-and-place apparatus 300 can be controlled through a simple control strategy to successfully complete the battery replacement. In some embodiments, the coordinates of the unmanned aerial vehicle 4000 corresponding to the set target position can also be used to ensure that the first charging apparatus 210 is successfully electrically connected to the unmanned aerial vehicle 4000 or the first battery 4110 through the simple control strategy, and to ensure that the power-on/off apparatus 500 successfully presses the power-on/off button of the unmanned aerial vehicle 4000 through the simple control strategy.

In some embodiments, as shown in FIG. 16, the centering apparatus 800 includes multiple pushing assemblies 810 and a second driving assembly 820. The second driving assembly 820 is connected to each of the pushing assemblies 810 to drive the pushing assemblies 810 to push the unmanned aerial vehicle 4000, and when pushing the unmanned aerial vehicle 4000, the pushing assemblies 810 apply pushing forces in different directions to the unmanned aerial vehicle 4000, to push the unmanned aerial vehicle 4000 to the target position and fix the unmanned aerial vehicle at the target position. Considering that there may be errors in a position and an orientation of the unmanned aerial vehicle 4000 when the unmanned aerial vehicle 4000 lands in the hangar body 100, propulsion forces in multiple different directions can not only adjust the orientation of the unmanned aerial vehicle 4000, but also push the unmanned aerial vehicle 4000 to the target position.

In some embodiments, as shown in FIG. 18, a quantity of pushing assemblies 810 is at least three, and each pushing assembly 810 includes a pushing member 811. A first pushing edge 811*a* is arranged on the pushing member 811, and the first pushing edges 811*a* of the multiple pushing members 811 form a polygon. An unmanned aerial vehicle rack 700 is arranged at a bottom portion of the unmanned aerial vehicle 4000, and the unmanned aerial vehicle rack 700 is suitable for being parked in the hangar body 100 and supporting the unmanned aerial vehicle 4000. Multiple second pushing edges 720 are formed on outer edges of the unmanned aerial vehicle rack 700, and the second pushing edges 720 are suitable for being in a one-to-one correspondence with and cooperating with the first pushing edges 811*a*. In some embodiments, a quantity of pushing members 811 is four, the first pushing edges 811*a* of the four pushing members 811 form a rectangle, and the outer edges of the unmanned aerial vehicle rack 700 form a rectangle.

In some embodiments, as shown in FIG. 16 and FIG. 17, the second driving assembly 820 includes a second driving member 821. When the pushing assemblies 810 need to push the unmanned aerial vehicle 4000, the second driving member 821 drives the pushing assemblies 810. In some embodiments, the second driving assembly 820 further includes a locking member (not shown in the figure), and when the pushing assemblies 810 need to fix the unmanned aerial vehicle 4000, the locking member applies a locking force to the pushing assemblies 810.

In some embodiments, as shown in FIG. 16 and FIG. 17, the second driving member 821 includes a second power unit 821*a* and a second transmission unit 821*b*, and the second power unit 821*a* is connected to each of the pushing assemblies 810 via the second transmission unit 821*b*. In some embodiments, the second power unit 821*a* is a motor or a pressure pump. The second transmission unit 821*b* is one or more of a connecting rod mechanism, a gear mechanism, a thrust sliding mechanism, a hydraulic mechanism, a pneumatic mechanism, and a screw mechanism. A locking member is a locking motor connected to the second transmission unit 821*b*.

In some embodiments, the first pushing edges 811*a* form a first pushing slope (not shown in the figure) facing downward, the second pushing edges 720 form a second pushing slope (not shown in the figure) facing upward, and the first pushing slope is suitable for cooperating with the corresponding second pushing slope. The cooperation between the first pushing slope and the second pushing slope and parking of the unmanned aerial vehicle rack 700 in the hangar body 100 limit a vertical direction of the unmanned aerial vehicle 4000, thereby ensuring that the unmanned aerial vehicle 4000 is well fixed in the hangar 1000.

In some embodiments, as shown in FIG. 2, the hangar body 100 includes a cabin door 110, a cabin body 120, and a cabin door opening and closing apparatus (not shown in the figure), and the cabin body 120 includes an unmanned aerial vehicle entrance and exit 121. The cabin door 110 is connected to the cabin body 120 via the cabin door opening and closing apparatus, and the cabin door opening and closing apparatus is configured to drive the cabin door 110 to switch between an open state and a closed state. When the cabin door 110 is in the closed state, the cabin door 110 closes the unmanned aerial vehicle entrance and exit 121; and when the cabin door 110 is in the open state, the cabin door 110 avoids the unmanned aerial vehicle entrance and exit 121 to allow the unmanned aerial vehicle entrance and exit 121 to be opened. In some embodiments, the unmanned aerial vehicle entrance and exit 121 is formed at a top portion of the cabin body 120, or the unmanned aerial vehicle entrance and exit 121 is formed at a tail portion of the cabin body 120.

In some embodiments, as shown in FIG. 2 and FIG. 3, the hangar 1000 further includes a parking platform 600. The parking platform 600 is configured to park the unmanned aerial vehicle 4000, and the parking platform 600 is movably arranged in the hangar body 100. Because the existing unmanned aerial vehicle needs to take off or land in an environment with no obstacles around, the parking platform 600 is set to be movable. When the unmanned aerial vehicle 4000 needs to take off or land, the unmanned aerial vehicle can be moved to an environment with no obstacles around by moving the parking platform 600. For example, when the unmanned aerial vehicle entrance and exit 121 is formed at the top portion of the cabin body 120, the parking platform 600 is set to be movable in an ascending or descending manner so that the unmanned aerial vehicle 4000 is transported out of the hangar body 100 through the unmanned aerial vehicle entrance and exit 121. When the unmanned aerial vehicle entrance and exit 121 is formed at the tail portion of the cabin body 120, the parking platform 600 is set to be horizontally movable so that the unmanned aerial vehicle 4000 is transported out of the hangar body 100 through the unmanned aerial vehicle entrance and exit 121.

In some embodiments, an electromagnet is arranged on the parking platform 600. When the unmanned aerial vehicle 4000 lands on the parking platform 600, the electromagnet can be energized to temporarily attract the unmanned aerial vehicle 4000 onto the parking platform 600, and the electromagnet can be de-energized after the parking platform 600 returns to the hangar body 100.

In some embodiments, as shown in FIG. 19, the hangar 1000 further includes a heat dissipation apparatus 900. The heat dissipation apparatus 900 is arranged in the hangar body 100, and the heat dissipation apparatus 900 is configured to perform heat dissipation on an internal space of the hangar body 100. Most of the time, the hangar body 100 is in a closed state, and the hangar 1000 is arranged on the vehicle 2000 and may be exposed to the sun for a long time when the vehicle is driving. This easily causes the hangar body 100 to reach a high temperature, which is not conducive to placement of the unmanned aerial vehicle 4000, the unmanned aerial vehicle battery 4100, and other electrical devices. Therefore, the heat dissipation apparatus 900 provided in the embodiments of the present disclosure can effectively reduce a temperature in the hangar body 100. In some embodiments, the heat dissipation apparatus 900 includes a heat dissipation fan 910, and a heat dissipation vent corresponding to the heat dissipation fan 910 is provided in the hangar body 100.

As shown in FIG. 20, the control method for a hangar 1000 for an unmanned aerial vehicle provided in the embodiments of the present disclosure includes the following step S101 and step S102.

S101: When a first preset condition is met, control a battery pick-and-place apparatus to detach a first battery on the unmanned aerial vehicle from the unmanned aerial vehicle, and mount a second battery outside the unmanned aerial vehicle into the unmanned aerial vehicle.

If there is a requirement to allow the unmanned aerial vehicle 4000 to briefly return to a hangar 1000 for battery replacement, a battery pick-and-place apparatus 300 is controlled to perform battery replacement on the unmanned aerial vehicle 4000, thereby quickly extending battery life time of the unmanned aerial vehicle 4000.

In some embodiments, a charging apparatus 200 includes a first charging apparatus 210 and a second charging apparatus 220. If the first preset condition is met, the battery pick-and-place apparatus 300 is controlled to detach the first battery 4110 on the unmanned aerial vehicle 4000 from the unmanned aerial vehicle 4000 and connect the first battery 4110 to the second charging apparatus 220, and the second battery 4120 connected to the second charging apparatus 220 is picked out and the second battery 4120 is mounted into the unmanned aerial vehicle 4000.

The first preset condition may include: The unmanned aerial vehicle 4000 is located at a target position in a hangar body 100; and the hangar 1000 receives a battery replacement signal, for example, a driver actively sends a battery replacement instruction to the hangar 1000, or a remaining power of the first battery 4110 is less than a first threshold and the hangar 1000 does not receive an unmanned aerial vehicle shutdown signal. For example, when a controller of the hangar 1000 or the vehicle 2000 determines that the remaining power of the first battery 4110 on the unmanned aerial vehicle 4000 no longer meets a requirement for continued flying, and the driver has no intention to stop the unmanned aerial vehicle from continuing to fly, the hangar 1000 may actively perform a battery replacement operation. In other words, when the first preset condition is met, it may be considered that there is a requirement to allow the unmanned aerial vehicle 4000 to briefly return to the hangar 1000 for battery replacement.

S102: When a second preset condition is met, the charging apparatus is controlled to be electrically connected to the unmanned aerial vehicle or the first battery on the unmanned aerial vehicle to charge the first battery.

If there is a requirement to allow the unmanned aerial vehicle 4000 to stop flying and return to the hangar 1000 for shutdown or standby, the charging apparatus 200 is controlled to directly and continuously charge the first battery 4110 on the unmanned aerial vehicle 4000, thereby stably and sustainably extending battery life time of the unmanned aerial vehicle 4000.

In some embodiments, the charging apparatus 200 includes the first charging apparatus 210 and the second charging apparatus 220. If the second preset condition is met, the first charging apparatus 210 is controlled to be electrically connected to the unmanned aerial vehicle 4000 or the first battery 4110 on the unmanned aerial vehicle 4000 to charge the first battery 4110.

The second preset condition may include: The unmanned aerial vehicle 4000 is located at the target position in the hangar body 100; and the hangar 1000 receives an unmanned aerial vehicle battery start charging signal, that is, the hangar 1000 can actively request the charging apparatus 200 to charge the first battery 4110 on the unmanned aerial vehicle 4000, or the hangar 1000 does not receive an unmanned aerial vehicle battery stop charging signal, that is, even if no charging requirement is received, if the unmanned aerial vehicle 4000 is located at the target position in the hangar body 100, the charging apparatus 200 may be allowed to charge the first battery 4110 on the unmanned aerial vehicle 4000 by default. In other words, when the second preset condition is met, it may be considered that there is a requirement to allow the unmanned aerial vehicle 4000 to stop continuing to fly and return to the hangar 1000 for parking or standby.

According to the control method for a hangar 1000 for an unmanned aerial vehicle provided in the embodiments of the present disclosure, the following may be implemented. The first battery 4110 with insufficient power can be detached via the battery pick-and-place apparatus 300 and the second battery 4120 with sufficient power can be mounted into the unmanned aerial vehicle 4000 in a process in which the unmanned aerial vehicle briefly returns to the hangar 1000 when the vehicle 2000 drives for a long time and the unmanned aerial vehicle needs to continuously follow the vehicle, thereby quickly extending the battery life time of the unmanned aerial vehicle 4000, so that the unmanned aerial vehicle 4000 continues to follow the vehicle. After the vehicle 2000 finishes short-time driving, or when the vehicle is parked, or when the unmanned aerial vehicle 4000 does not need to follow the vehicle, the unmanned aerial vehicle 4000 can be returned to the hangar 1000 for standby, and the unmanned aerial vehicle battery 4100 can be charged by the charging apparatus 200, thereby stably and sustainably meeting a battery life requirement of the unmanned aerial vehicle 4000 for following the vehicle next time, and there is no need to stop the vehicle or manually replace or charge the battery in the entire process.

The control method for a hangar 1000 for an unmanned aerial vehicle provided in the embodiments of the present disclosure further includes step S103.

S103: After the hangar receives an unmanned aerial vehicle power-on signal, an unmanned aerial vehicle power-off signal, an unmanned aerial vehicle take-off preparation signal, or an unmanned aerial vehicle landing completion signal, control the power-on/off apparatus to press a power-on/off button of the unmanned aerial vehicle.

The control method for a hangar 1000 for an unmanned aerial vehicle provided in the embodiments of the present disclosure further includes step S104 and step S105.

S104: After the hangar receives the unmanned aerial vehicle take-off preparation signal or an unmanned aerial vehicle landing completion signal, control a cabin door opening and closing apparatus to drive a cabin door to switch from a closed state for closing an unmanned aerial vehicle entrance and exit to an open state for avoiding the unmanned aerial vehicle entrance and exit.

S105: After the hangar receives an unmanned aerial vehicle take-off completion signal or the unmanned aerial vehicle landing completion signal, control the cabin door opening and closing apparatus to drive the cabin door to switch from the open state for avoiding the unmanned aerial vehicle entrance and exit to the closed state for closing the unmanned aerial vehicle entrance and exit.

In other words, when the unmanned aerial vehicle 4000 is stably located in the hangar body 100, the cabin door opening and closing apparatus is controlled to enable the cabin door 110 to close the unmanned aerial vehicle entrance and exit 121, to ensure stability of the hangar 1000 during driving of the vehicle 2000; and when the unmanned aerial vehicle 4000 needs to pass through the unmanned aerial vehicle entrance and exit 121, the cabin door opening and closing apparatus is controlled to enable the cabin door 110 to open the unmanned aerial vehicle entrance and exit 121.

The control method for a hangar 1000 for an unmanned aerial vehicle provided in the embodiments of the present disclosure further includes step S106 and step S107.

S106: After the hangar receives the unmanned aerial vehicle take-off preparation signal or the unmanned aerial vehicle landing preparation signal, control the parking platform to move to a first preset position.

S107: After the hangar receives the unmanned aerial vehicle take-off completion signal or the unmanned aerial vehicle landing completion signal, control the parking platform to move to a second preset position.

A height of the first preset position is greater than a height of the second preset position. Because the existing unmanned aerial vehicle needs to take off or land in an environment with no obstacles around, the parking platform 600 is moved from the height of the second preset position covered by the hangar 1000 to the height of the first preset position that is higher than the hangar 1000. When the unmanned aerial vehicle 4000 needs to take off or land, the unmanned aerial vehicle can be moved to an environment with no obstacles around by moving the parking platform 600.

The control method for a hangar 1000 for an unmanned aerial vehicle provided in the embodiments of the present disclosure further includes step S108 and step S109.

S108: After the hangar receives the unmanned aerial vehicle take-off preparation signal, or after controlling a battery pick-and-place apparatus to detach a first battery on the unmanned aerial vehicle from the unmanned aerial vehicle, and mounting a second battery outside the unmanned aerial vehicle into the unmanned aerial vehicle, control the centering apparatus to switch from a state of fixing the unmanned aerial vehicle to a state of releasing the unmanned aerial vehicle.

S109: After the hangar receives the unmanned aerial vehicle landing completion signal, or before controlling a battery pick-and-place apparatus to detach a first battery on the unmanned aerial vehicle from the unmanned aerial vehicle, and mounting a second battery outside the unmanned aerial vehicle into the unmanned aerial vehicle, control the centering apparatus to push the unmanned aerial vehicle to the target position and fix the unmanned aerial vehicle at the target position.

In other words, when the unmanned aerial vehicle 4000 needs to take off from the hangar 1000, a restraint on the unmanned aerial vehicle by the centering apparatus 800 needs to be released, to create conditions for the take-off of the unmanned aerial vehicle 4000; and when the unmanned aerial vehicle 4000 needs to return to the hangar 1000, the unmanned aerial vehicle 4000 needs to be fixed at the target position via the centering apparatus 800, to prevent the unmanned aerial vehicle 4000 from shaking in the hangar 1000 when the vehicle 2000 is driving, thereby providing stable conditions for the battery replacement of the battery pick-and-place apparatus 300.

The control method for a hangar 1000 for an unmanned aerial vehicle provided in the embodiments of the present disclosure further includes step S110.

S110: After the hangar receives a hangar heat dissipation signal or when an internal temperature of the hangar is greater than a preset temperature, control the heat dissipation apparatus to perform heat dissipation on an internal space of the hangar body.

For example, if the driver believes that the hangar 1000 needs to perform heat dissipation, the driver can actively issue a heat dissipation instruction to the hangar 1000, or if a controller of the hangar 1000 or the vehicle 2000 determines that the internal temperature of the hangar 1000 is too high, the hangar 1000 can actively perform a heat dissipation operation.

The control method for a hangar 1000 for an unmanned aerial vehicle provided in the embodiments of the present disclosure may include step S201 to step S232.

As shown in FIG. 21, a take-off process of an unmanned aerial vehicle 4000 includes step S201 to step S206.

S201: Determine whether a hangar receives an unmanned aerial vehicle take-off preparation signal, if yes, perform step S202, and if not, end.

S202: Determine whether an unmanned aerial vehicle is in a power-off state, if yes, perform step S203, and if not, perform step S204.

S203: Control a power-on/off apparatus to press a power-on/off button of the unmanned aerial vehicle to start the unmanned aerial vehicle, and then perform step S204.

S204: Control a cabin door opening and closing apparatus to drive a cabin door to switch from a closed state for closing an unmanned aerial vehicle entrance and exit to an open state for avoiding the unmanned aerial vehicle entrance and exit, and then perform step S205.

S205: Control a parking platform to move to a first preset position, and then perform step S206.

S206: Control a centering apparatus to switch from a state of fixing the unmanned aerial vehicle to a state of releasing the unmanned aerial vehicle, and then perform step S207.

S207: Determine whether the hangar receives an unmanned aerial vehicle take-off completion signal, if not, continue to perform step S207, and if yes, perform step S208.

S208: Control the parking platform to move to a second preset position, and perform S209.

S209: Control the cabin door opening and closing apparatus to drive the cabin door to switch from the open state for avoiding the unmanned aerial vehicle entrance and exit to the closed state for closing the unmanned aerial vehicle entrance and exit.

As shown in FIG. 22, when the first preset condition is met, a process of short return for battery replacement of the unmanned aerial vehicle 4000 includes step S210 to step S223.

S210: Determine whether a hangar receives an unmanned aerial vehicle landing preparation signal, if yes, perform step S211, and if not, end.

S211: Control the cabin door opening and closing apparatus to drive a cabin door to switch from the closed state for closing the unmanned aerial vehicle entrance and exit to the open state for avoiding the unmanned aerial vehicle entrance and exit, and then perform step S212.

S212: Control the parking platform to move to the first preset position, and then perform step S213.

S213: Determine whether the hangar receives an unmanned aerial vehicle landing completion signal, if not, continue to perform step S213, and if yes, perform step S214.

S214: Control the parking platform to move to the second preset position, and then perform step S215.

S215: Control the cabin door opening and closing apparatus to drive the cabin door to switch from the open state for avoiding the unmanned aerial vehicle entrance and exit to the closed state for closing the unmanned aerial vehicle entrance and exit, and then perform step S216.

S216: Control the centering apparatus to push the unmanned aerial vehicle to a target position and fix the unmanned aerial vehicle at the target position, and then perform step S217.

S217: Control a battery pick-and-place apparatus to detach a first battery on the unmanned aerial vehicle from the unmanned aerial vehicle and connect the first battery to a second charging apparatus, and pick out a second battery connected to the second charging apparatus and mount the second battery into the unmanned aerial vehicle, and then perform step S218.

S218: Control the cabin door opening and closing apparatus to drive the cabin door to switch from the closed state for closing the unmanned aerial vehicle entrance and exit to the open state for avoiding the unmanned aerial vehicle entrance and exit, and then perform step S219.

S219: Control the parking platform to move to the first preset position, and then perform step S220.

S220: Control the centering apparatus to switch from a state of fixing the unmanned aerial vehicle to a state of releasing the unmanned aerial vehicle, and then perform step S221.

S221: Determine whether the hangar receives an unmanned aerial vehicle take-off completion signal, if not, continue to perform step S221, and if yes, perform step S222.

S222: Control the parking platform to move to the second preset position, and then perform step S223.

S223: Control the cabin door opening and closing apparatus to drive the cabin door to switch from the open state for avoiding the unmanned aerial vehicle entrance and exit to the closed state for closing the unmanned aerial vehicle entrance and exit.

As shown in FIG. 23, when the second preset condition is met, a process in which the unmanned aerial vehicle 4000 stops operating and is recovered includes step S218 to step S223.

S224: Determine whether the hangar receives the unmanned aerial vehicle landing preparation signal, if yes, perform step S225, and if not, end.

S225: Control the cabin door opening and closing apparatus to drive the cabin door to switch from the closed state for closing the unmanned aerial vehicle entrance and exit to the open state for avoiding the unmanned aerial vehicle entrance and exit, and then perform step S226.

S226: Control the parking platform to move to the first preset position, and then perform step S227.

S227: Determine whether the hangar receives the unmanned aerial vehicle landing completion signal, if not, continue to perform step S227, and if yes, perform step S228.

S228: Control the parking platform 600 to move to the second preset position, and then perform step S229.

S229: Control the cabin door opening and closing apparatus to drive the cabin door to switch from the open state for avoiding the unmanned aerial vehicle entrance and exit to the closed state for closing the unmanned aerial vehicle entrance and exit, and then perform step S230.

S230: Control the centering apparatus to push the unmanned aerial vehicle to the target position and fix the unmanned aerial vehicle at the target position, and then perform step S231.

S231: Control the power-on/off apparatus to press the power-on/off button of the unmanned aerial vehicle to close the unmanned aerial vehicle, and then perform step S232.

S232: Control the first charging apparatus to be electrically connected to the unmanned aerial vehicle or the first battery on the unmanned aerial vehicle to charge the first battery.

As shown in FIG. 24, embodiments of the present disclosure further provide a control device 3000 for a hangar 1000 for an unmanned aerial vehicle, including a processor 3100 and a memory 3200. The processor 3100 and the memory 3200 are connected to each other. The memory 3200 is configured to store a computer program. The computer program includes program instructions, and the processor 3100 is configured to invoke the program instructions, to perform the control method provided in the embodiments of the present disclosure.

Embodiments of the present disclosure further provide a computer-readable storage medium. The computer-readable storage medium stores a computer program. When the computer program is executed by a processor, the control method provided in the embodiments of the present disclosure is implemented.

Other structures and operations of the hangar 1000 for the unmanned aerial vehicle, the vehicle 2000, and the control device 3000 according to the embodiments of the present disclosure are known to a person of ordinary skill in the art and will not be described in detail herein.

The computer-readable storage medium may be an internal storage unit of a task processing apparatus provided in any one of the foregoing embodiments, for example, a hard disk or an internal memory of the electronic device. The computer-readable storage medium may also be an external storage device of the electronic device, such as a plug-in hard disk, a smart media card (SMC), a secure digital (SD) card, or a flash card that is equipped on the electronic device. The computer-readable storage medium may further include a magnetic disk, an optical disc, a read-only memory (ROM), a random access memory (RAM), or the like. Further, the computer-readable storage medium may further include an internal storage unit of the electronic device and an external storage device. The computer-readable storage medium is configured to store the computer program and another program and data that are required by the electronic device. The computer-readable storage medium may be further configured to temporarily store data that has been output or data to be output.

The terms "first", "second", and the like in the claims, the specification, and the accompanying drawings of the present disclosure are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device. "Embodiment" mentioned in the specification means that particular features, structures, or characteristics described with reference to the embodiment may be included in at least one embodiment of the present disclosure. The term appearing at different positions of the specification may not refer to the same embodiment or an independent or alternative embodiment that is mutually exclusive with another embodiment. A person skilled in the art explicitly or implicitly understands that the embodiments described in the specification may be combined with other embodiments. The term "and/or" used in the specification and the appended claims of the present disclosure refers to any combination and all possible combinations of one or more associated listed items, and includes these combinations.

A person of ordinary skill in the art may be aware that the units and algorithm steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. A person skilled in the art may use different methods to implement the described functions for each particular application, but it should not be considered that the implementation goes beyond the scope of the present disclosure.

In the description of this specification, the description of the reference terms such as "an embodiment", "some embodiments", "exemplary embodiments", "example", "specific example", or "some examples" means that the specific features, structures, materials or characteristics described with reference to the embodiment or example are included in at least one embodiment or example of the present disclosure. In this specification, schematic descriptions of the foregoing terms do not necessarily point at a same embodiment or example. In addition, the described specific features, structures, materials, or characteristics may be combined in a proper manner in any one or more of the embodiments or examples.

Although the embodiments of the present disclosure have been shown and described, a person of ordinary skill in the art may understand that: various changes, modifications, replacements, and variations may be made to the embodiments without departing from the principles and spirit of the present disclosure, and the scope of the present disclosure is as defined by the appended claims and their equivalents.

What are disclosed above are merely examples of embodiments of the present disclosure, and certainly are not intended to limit the protection scope of the present disclosure. Therefore, equivalent variations made in accordance with the claims of the present disclosure shall fall within the scope of the present disclosure.

What is claimed is:

1. A hangar for an unmanned aerial vehicle, suitable for being arranged on a vehicle, comprising:

a hangar body, the hangar body being configured to accommodate the unmanned aerial vehicle;

a charging apparatus, the charging apparatus being arranged in the hangar body, and the charging apparatus being configured to charge an unmanned aerial vehicle battery, wherein the unmanned aerial vehicle battery includes a first battery mounted on the unmanned aerial vehicle and/or a second battery outside the unmanned aerial vehicle; and a battery pick-and-place apparatus, the battery pick-and-place apparatus being arranged in the hangar body, and the battery pick-and-place apparatus being configured to detach the first battery from the unmanned aerial vehicle and/or mount the second battery into the unmanned aerial vehicle, wherein the charging apparatus includes a first charging apparatus, and the first charging apparatus is configured to charge, by connecting to the unmanned aerial vehicle or the first battery, the first battery mounted on the unmanned aerial vehicle, and the hangar further comprising a parking platform, the parking platform being configured to park the unmanned aerial vehicle; the first charging apparatus comprising an unmanned aerial vehicle rack and an electrical connecting wire;

the unmanned aerial vehicle rack being mounted on the unmanned aerial vehicle, and the unmanned aerial vehicle rack being suitable for being parked on the parking platform and supporting the unmanned aerial vehicle;

the electrical connecting wire being arranged on the unmanned aerial vehicle rack; and a first fitting portion and a second fitting portion being arranged on the electrical connecting wire, the first fitting portion being suitable for being electrically connected to a charging interface of the unmanned aerial vehicle or the first battery, and the second fitting portion being suitable for being electrically connected to a power supply interface of the parking platform.

2. The hangar for an unmanned aerial vehicle according to claim 1, wherein the battery pick-and-place apparatus comprises a clamping mechanism; and the clamping mechanism comprises a first driving assembly and two clamping members, wherein the first driving assembly is connected to at least one of the clamping members to drive the at least one of the clamping members to switch between a clamping state and a releasing state, when the clamping members are in the clamping state, the two clamping members are suitable for clamping the unmanned aerial vehicle battery, and when the clamping members are in the releasing state, the two clamping members are suitable for detaching from the unmanned aerial vehicle battery.

3. The hangar for an unmanned aerial vehicle according to claim 1, wherein the battery pick-and-place apparatus comprises a lifting mechanism, and the lifting mechanism is suitable for cooperating with a bottom surface of the unmanned aerial vehicle battery to support the unmanned aerial vehicle battery.

4. The hangar for an unmanned aerial vehicle according to claim 1, further comprising a movable rack, the movable rack being movably arranged in the hangar body along a first direction, and the battery pick-and-place apparatus being movably arranged on the movable rack along a second direction, wherein the first direction is not parallel to the second direction, and the first direction and the second direction each have a component in a horizontal plane direction.

5. The hangar for an unmanned aerial vehicle according to claim 1, wherein a wiring channel is provided on the unmanned aerial vehicle rack, the wiring channel extends to a bottom portion of the unmanned aerial vehicle rack, the electrical connecting wire is arranged in the wiring channel, and the second fitting portion is connected to the bottom portion of the unmanned aerial vehicle rack.

6. The hangar for an unmanned aerial vehicle according to claim 1, wherein the second fitting portion comprises a contact convex point, a contact groove is provided on the power supply interface, and the contact convex point is suitable for extending into the contact groove to enable the second fitting portion to be electrically connected to the power supply interface; and a mounting channel is provided in the second fitting portion, a second elastic unit is arranged in the mounting channel, the contact convex point is at least partially arranged in the mounting channel and cooperates with the second elastic unit, and the second elastic unit applies a force toward the contact convex point to enable the contact convex point to have a tendency to extend out of the mounting channel.

7. The hangar for an unmanned aerial vehicle according to claim 1, further comprising a centering apparatus, the centering apparatus being arranged in the hangar body, and the centering apparatus being suitable for pushing the unmanned aerial vehicle to a target position and fixing the unmanned aerial vehicle at the target position; and the battery pick-and-place apparatus being configured to detach the first battery from the unmanned aerial vehicle located at the target position and/or mount the second battery into the unmanned aerial vehicle located at the target position.

8. The hangar for an unmanned aerial vehicle according to claim 7, wherein the centering apparatus comprises a plurality of pushing assemblies and a second driving assembly; and the second driving assembly is connected to each of the pushing assemblies to drive the pushing assemblies to push the unmanned aerial vehicle, and when pushing the unmanned aerial vehicle, the pushing assemblies apply pushing forces in different directions to the unmanned aerial vehicle, to push the unmanned aerial vehicle to the target position and fix the unmanned aerial vehicle at the target position.

9. The hangar for an unmanned aerial vehicle according to claim 1, wherein the hangar body comprises a cabin door, a cabin body, and a cabin door opening and closing apparatus, and the cabin body comprises an unmanned aerial vehicle entrance and exit;

the cabin door is connected to the cabin body via the cabin door opening and closing apparatus, and the cabin door opening and closing apparatus is configured to drive the cabin door to switch between an open state and a closed state;

when the cabin door is in the closed state, the cabin door closes the unmanned aerial vehicle entrance and exit; and when the cabin door is in the open state, the cabin door avoids the unmanned aerial vehicle entrance and exit to allow the unmanned aerial vehicle entrance and exit to be opened.

10. The hangar for an unmanned aerial vehicle according to claim 9, wherein the unmanned aerial vehicle entrance and exit is formed at a top portion of the cabin body, or the unmanned aerial vehicle entrance and exit is formed at a tail portion of the cabin body.

11. The hangar for an unmanned aerial vehicle according to claim 1, further comprising a parking platform, the parking platform being configured to park the unmanned aerial vehicle, and the parking platform being movably arranged in the hangar body.

12. The hangar for an unmanned aerial vehicle according to claim 1, further comprising a heat dissipation apparatus, the heat dissipation apparatus being arranged in the hangar body, and the heat dissipation apparatus being configured to perform heat dissipation on an internal space of the hangar body.

13. A vehicle, equipped with the hangar for an unmanned aerial vehicle according to claim 1.

14. A hangar for an unmanned aerial vehicle, suitable for being arranged on a vehicle, comprising:

a hangar body, the hangar body being configured to accommodate the unmanned aerial vehicle;

a charging apparatus, the charging apparatus being arranged in the hangar body, and the charging apparatus being configured to charge an unmanned aerial vehicle battery, wherein the unmanned aerial vehicle battery includes a first battery mounted on the unmanned aerial vehicle and/or a second battery outside the unmanned aerial vehicle; and a battery pick-and-place apparatus, the battery pick-and-place apparatus being arranged in the hangar body, and the battery pick-and-place apparatus being configured to detach the first battery from the unmanned aerial vehicle and/or mount the second battery into the unmanned aerial vehicle, the hangar further comprising a power-on/off apparatus, the power-on/off apparatus being arranged in the hangar body; and the power-on/off apparatus being switchable between a trigger state and an avoidance state, when the power-on/off apparatus is in the trigger state, the power-on/off apparatus being suitable for pressing a power-on/off button of the unmanned aerial vehicle, and when the power-on/off apparatus is in the avoidance state, the power-on/off apparatus being suitable for being separated from the power-on/off button or skipping applying a force to the power-on/off button.

15. The hangar for an unmanned aerial vehicle according to claim 14, further comprising a movable rack, the movable rack being movably arranged in the hangar body along a first direction, and both the power-on/off apparatus and the battery pick-and-place apparatus being movably arranged on the movable rack along a second direction, wherein the first direction is not parallel to the second direction, and the first direction and the second direction each have the component in the horizontal plane direction.

16. A hangar for an unmanned aerial vehicle, suitable for being arranged on a vehicle, comprising:

a hangar body, the hangar body being configured to accommodate the unmanned aerial vehicle;

a charging apparatus, the charging apparatus being arranged in the hangar body, and the charging apparatus being configured to charge an unmanned aerial vehicle battery, wherein the unmanned aerial vehicle battery includes a first battery mounted on the unmanned aerial vehicle and/or a second battery outside the unmanned aerial vehicle; and a battery pick-and-place apparatus, the battery pick-and-place apparatus being arranged in the hangar body, and the battery pick-and-place apparatus being configured to detach the first battery from the unmanned aerial vehicle and/or mount the second battery into the unmanned aerial vehicle, wherein the charging apparatus includes a second charging apparatus, and the second charging apparatus is configured to charge the second battery outside the unmanned aerial vehicle by connecting to the second battery, and wherein the second charging apparatus includes a plurality of charging grooves, the charging grooves are fixedly provided in the hangar body, insertion ports are provided on the charging grooves, and the second battery is suitable for being inserted into the charging grooves through the insertion ports for charging;

the plurality of charging grooves are provided side by side, and the insertion ports of the plurality of charging grooves are oriented in a same direction; among the plurality of charging grooves, adjacent charging grooves are spaced apart or are provided close to each other; or the plurality of charging grooves are circumferentially arranged at intervals around a vertical axis, and the insertion ports of the plurality of charging grooves are oriented away from the vertical axis.

17. The hangar for an unmanned aerial vehicle according to claim 16, wherein the battery pick-and-place apparatus is further configured to connect the first battery to the second charging apparatus after detaching the first battery from the unmanned aerial vehicle, and/or mount the second battery into the unmanned aerial vehicle after picking out the second battery connected to the second charging apparatus.

*     *     *     *     *